United States Patent [19]
Hendy

[11] 4,039,734
[45] Aug. 2, 1977

[54] PRODUCTION OF RANDOM OR HOMOGENEOUS COPOLYMERS

[75] Inventor: Brian Norman Hendy, Welwyn, England

[73] Assignee: Imperial Chemical Industries Limited, London, England

[21] Appl. No.: 589,689

[22] Filed: June 24, 1975

Related U.S. Application Data

[63] Continuation of Ser. No. 519,167, Oct. 29, 1974, abandoned, which is a continuation of Ser. No. 425,280, Dec. 17, 1973, abandoned, which is a continuation-in-part of Ser. No. 347,567, April 3, 1973, which is a continuation-in-part of Ser. No. 183,638, Sept. 24, 1971, abandoned, Ser. No. 62,799, Aug. 11, 1970, abandoned, and Ser. No. 871,962, Oct. 28, 1969, abandoned, said Ser. No. 183,638, is a continuation-in-part of Ser. No. 871,962, and Ser. No. 100,432, Dec. 21, 1970, abandoned, which is a continuation of Ser. No. 755,793, Aug. 28, 1968, abandoned, said Ser. No. 871,962, and Ser. No. 755,793, each is a continuation-in-part of Ser. No. 623,229, March 15, 1967, abandoned, said Ser. No. 62,799, is a continuation-in-part of Ser. No. 765,426, Oct. 7, 1968, abandoned, and Ser. No. 756,014, Aug. 28, 1968, abandoned, each is a continuation-in-part of Ser. No. 622,268, March 10, 1967, abandoned.

[30] Foreign Application Priority Data

| Mar. 24, 1966 | United Kingdom | 13070/66 |
| Mar. 24, 1966 | United Kingdom | 13072/66 |
| Mar. 10, 1970 | United Kingdom | 11389/70 |
| Mar. 24, 1966 | United Kingdom | 13069/66 |
| Sept. 20, 1967 | United Kingdom | 42898/67 |
| Sept. 20, 1967 | United Kingdom | 42900/67 |
| Mar. 27, 1970 | Italy | 22623/70 |

[51] Int. Cl.$^2$ .......... C08F 218/14; C08G 81/00; C08F 200/00; C08F 220/42

[52] U.S. Cl. .......... 526/258; 260/29.6 R; 260/29.6 AN; 260/29.7 R; 260/32.6 N; 260/32.8 N; 260/45.95 R; 260/470 A; 260/630 Y; 260/73 R; 260/79.3 M; 260/880 R; 260/887; 264/210 R; 526/83; 526/220; 526/224; 526/229; 526/259; 526/261; 526/265; 526/281; 526/293; 526/332; 526/342

[58] Field of Search .......... 260/78.5 R, 806, 80.78, 260/85.5 R; 526/258, 259, 261, 265, 281, 293, 332, 342

[56] References Cited

U.S. PATENT DOCUMENTS

| 2,417,294 | 3/1947 | D'Alelio | 260/85.5 HC |
| 2,528,710 | 11/1950 | Richards | 260/85.5 HC |
| 2,721,785 | 10/1955 | Zybert | 260/85.5 HC |
| 3,198,775 | 8/1965 | Delacretaz et al. | 260/85.5 R |
| 3,275,612 | 9/1960 | Bechtold | 260/85.5 S |
| 3,819,762 | 6/1974 | Howe | 260/879 |

*Primary Examiner*—Joseph L. Schofer
*Assistant Examiner*—Herbert J. Lilling
*Attorney, Agent, or Firm*—Cushman, Darby & Cushman

[57] ABSTRACT

A method is provided for the production of homogeneous copolymers from monomers having differing reaction rates; in particular copolymers of acrylonitrile or of vinylidene chloride are disclosed. The monomers are fed to the reaction mixture at a rate sufficient to maintain a constant monomer ratio in the reaction mixture throughout the course of the reaction, the rate of addition being determined by the rate of evolution of heat as measured by the rate that a cooling system removes heat evolved by the reaction. An injection-mouldable copolymer consisting essentially of acrylonitrile units and uniformly distributed units of styrene or α-methyl styrene may be produced in this way. Films of the copolymer can be oriented by stretching at 90°–140° C. Its softening point may be increased by copolymerizing a minor amount of N-aryl maleimide.

43 Claims, 10 Drawing Figures

Copolymerisation of a mixture of 98.7 mole % acrylonitrile and 1.3 mole % styrene.

ACRYLONITRILE/STYRENE
A MOLAR RATIO = 3.65
B MOLAR RATIO = 1

PRODUCTION OF RANDOM OR HOMOGENEOUS COPOLYMERS

This application is a continuation of my application Ser. No. 519,167 filed Oct. 24, 1974 and now abandoned, which was a continuation of my application Ser. No. 425,280, filed Dec. 17, 1973, which in turn was a continuation-in-part of my U.S. application Ser. No. 347,567 filed 3 Apr. 1973.

U.S. application Ser. No. 347,567 was a continuation-in-part application of U.S. application Ser. No. 62799 filed 11 Aug. 1970. The latter was a continuation-in-part of Ser. No. 765,426 filed 7 Oct. 1968 and Ser. No. 756,014 filed 28 Aug. 1968, each of which was a continuation-in-part of Ser. No. 622,268 filed 10 March 1967.

U.S. application Ser. No. 347,567 was also a continuation-in-part of U.S. application Ser. Nos. 183,638 filed 24 Sept. 1971 and Ser. No. 871,962 filed 28 Oct. 1969. Ser. No. 183,638 was a continuation-in-part of Ser. No. 871,962 and of Ser. No. 100,432 filed 21 Dec. 1970 as a continuation of Ser. No. 755,793 filed 28 Aug. 1968. Each of Ser. Nos. 871,962 and 755,793 was a continuation-in-part of Ser. No. 623,229 filed 15 March 1967.

All these earlier applications, the disclosures of which are incorporated herein by reference, are now abandoned except Ser. No. 347,667.

This application relates to a method for the production of random or homogeneous copolymers from monomers whose rates of copolymerization are different. The more reactive monomer, alone or mixed with other monomer is added to the reaction mixture at such a rate that the relative proportions of the monomers in the reaction mixture remain constant. The required rate is determined by the rate that heat is evolved during the reaction. It has been found that in a copolymerization reaction of this type, the heat output may most conveniently be determined by employing a cooling system and measuring the heat extracted from the reaction mixture. By a "random copolymer" or a "homogeneous copolymer" I mean one in which the average composition of a polymer molecule formed early in the reaction is substantially the same as one formed at any later period.

In the production of a copolymer, it is not uncommon to find that one of the monomers copolymerizes more readily than another, with the result that in a conventional batch process, a relatively high proportion of this monomer is incorporated in the polymer formed early in the reaction, leaving a relatively low proportion in the monomer mixture to be incorporated into polymer formed later on. Non-random copolymers produced in this way often have dissappointing mechanical properties.

The idea of feeding monomers to the reaction mixture during the reaction in order to produce random copolymers is not new in itself.

U.S. Pat. No. 2,100,900 of Fikentscher and Hengstenberg states that uniform inter-polymerization products can be obtained by the polymerization of at least two polymerizable unsaturated organic compounds of different speeds of polymerization in aqueous emulsion by adding the compound having the higher speed of polymerization at about the rate at which it is used up to the compound having the lower speed of polymerization. It is further stated that the progress and prevailing state of the polymerization may be ascertained by determining the dry content or the specific gravity of a sample withdrawn; no other method is suggested and specific gravity determinations are used in all the examples.

U.S. Pat. No. 2,496,384 of de Nie refers to the abovementioned U.S. Pat. No. 2,100,900 and proposes the addition to the polymerization system of not just the faster-polymerizing monomer but of a mixture of monomers of the same composition as that of the copolymer being formed. The addition of the mixture at the rate of conversion of the monomers into copolymer is said to be most conveniently accomplished by withdrawing a sample of the emulsified reacting mixture and determining the specific gravity of it whereby the amount of polymer formed can be determined and thus the rate of addition ascertained. It is said that a correlation between specific gravity and polymer content can be made by a few simple experiments using samples removed at different times in a trial run. No other method of determining the rate of polymerization is suggested.

U.S. Pat. No. 2,628,957 of Tucker relates to the copolymerization of two particular monomers (vinyl chloride and styrene) conducted in presence of a particular "redox" catalyst (a combination of a water-soluble persulfate and a water-soluble sulfite). It is said that the styrene content of the mixture must be precisely controlled throughout the reaction cycle lest a product be formed consisting of a mixture of copolymers of widely varying styrene content, and that it is best controlled by adding styrene in a continuous manner so as to replace that being used up in the reaction. It is said that the amount of styrene needed may be calculated from the "reaction rate", or it may be more precisely determined by measuring the "heat of reaction" and adding just enough styrene to replace that used as indicated by the quantity of heat liberated; still another method is based upon total solids analysis performed on small samples removed from the reaction vessel at intervals during the reaction. One of these sampling techniques (it is not stated which) is used in the examples, and no other explanation is given as to how the "reaction rate" might be measured.

In the encyclopedia "Methoden der organischen Chemie (Houben-Weyl)", 4th edition, edited by E Müller, Volume XIV Part 1 (Georg Thieme Verlag, Stuttgart, 1961), in Chapter $A_1$, II, (a) by H Logemann on the technique of polymerizing vinyl and divinyl compounds in heterogeneous phases, Section 12 (pages 161–167) entitled "Peculiarities of copolymerization" refers to the above-mentioned U.S. Pat. Nos. as follows: 2,100,900 on page 162 footnote 2; 2,628,957 on page 164 footnote 4; and 2,496,384 on page 165 footnote 1. All three references include extracts from working examples in the patents and mention in each case that samples were removed periodically from the reaction mixture in order to follow the course of polymerization. On page 162 after the extract from U.S. Pat. No. 2,100,900 it is stated to be an advantage to have analytical methods that provide a picture of the progress of the reaction sufficiently quickly; and measurements of the "heat of reaction", density, refractive index, vapour tension and boiling point of samples of the emulsion removed during the reaction are said to be quicker than determination of solids content.

The determination of the "heat of reaction" of a sample by means of thermometric titration (or enthalpy titration) is and was a well-known and popular analytical technique. In such a titration method, there is added slowly to the sample a standard solution which reacts with the material to be estimated so that heat is evolved (or absorbed), and the variation of temperature with the amount of the standard solution added is plotted graphically so that the amount added from the onset of addition to the change iin slope of the temperature/addition curve gives the amount of standard solution required to react with the material to be estimated and hence and estimation of that material. The term "heat of reaction" in a description of an analytical technique is thus referring to the heat of the reaction of a sample containing a reactive substance when treated with an added reagent, and the term has no relation whatever to the heat balance of the system from which the sampl was taken for analysis.

I have discovered that measurement of the heat produced during polymerization can be coupled with monomer feeding such that copolymers of random composition can be readily produced. The total integrated heat at any time gives directly the extent of polymerization at that time, and the rate of evolution of heat gives the rate of polymerization from which the amount and rate of monomer feeding may be accurately calculated.

According to the present invention an improvement is provided in a method for the batchwise production of copolymers by polymerizing a mixture of at least two polymerizable monomers having different reaction rates in an exothermic polymerization reaction, which comprises measuring the heat evolved by the reaction and feeding at least a portion of faster-reacting monomer or monomers to the mixture at a rate dependent on the rate of production of heat in the copolymer formation, thereby producing homogeneous copolymers in which the average composition of polymer molecule formed at the beginning of the reaction is substantially the same as one formed at any later period. The rate of production of heat in polymer formation is preferably measured by a calorimetric technique which comprises measuring the heat removed from the reaction vessel by a material in thermal contact therewith. The amount of heat produced in a polymerization reaction provides an accurate indication of the amount of polymer formed and hence of the amount of the monomer to be added to restore its content in the reaction mixture to the original level.

In particular, there is provided according to may invention a method for the batchwise production of uniform copolymers from two or more monomers having different reaction rates in which heat is removed from the reaction vessel by heat exchanging with a fluid whereby the rate of production of heat in the copolymer formation may be determined and in which at least a portion of faster-reacting monomer or monomers is fed to the reaction mixture at a rate dependent on the rate of production of heat in the copolymer formation so that the total amount of said monomer or monomers fed to the reaction mixture up to any given time corresponds to the total amount of heat produced up to that time.

On a large scale, a cooling liquid (e.g. water) may be recirculated around the reaction vessel and the heat produced in the polymerization reaction can then be calculated from the temperature rise undergone by the liquid and its rate of flow, the latter being thermostatically controlled by the temperature of the reaction medium. For operations on a smaller scale, the heat is conveniently removed by supplying the latent heat of evaporation of a liquid or solid (e.g. solid carbon dioxide) brought into contact with a surface of the reaction vessel, and the volume of the vapour (or of liquid condensed therfrom) is a measure of the amount of heat produced in the reaction.

On a small scale it is particularly convenient to allow heat to be transferred from the reaction medium to a liquid whose boiling point is at or slightly below the reaction temperature. The transferred heat supplies the latent heat of evaporation, and by measuring the quantity of the evaporated material the amount of heat released in the polymerization reaction over a given time is readily ascertained. The removal of the heat by distilling the liquid also serves to keep the temperature of the reaction medium approximately constant.

By way of illustration, FIGS. 1, 2 and 3 of the accompanying drawings show examples of devices in which a random copolymer may be made according to the invention.

Figure 1:
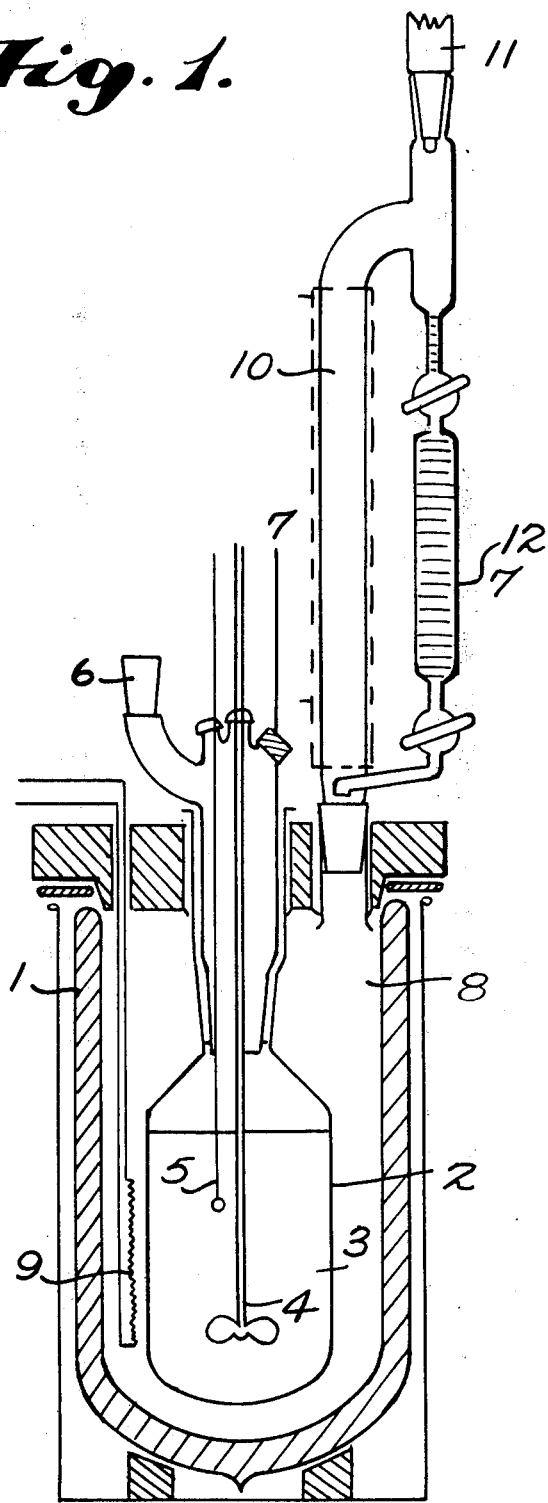
FIG. 1 shows in longitudinal section an apparatus for small scale reactions in which the reaction mixture is jacketed by a liquid which boils at the temperature of reaction; means are provided for continual measurement of the amount of distilled jacketing liquid and returning it to the jacket.

Referring to the apparatus shown in FIG. 1, external thermal insulation is provided by a Dewar flask 1. A glass reaction vessel 2 is accommodated within the Dewar flask 1 and contains the reaction mixture 3, a stirrer 4 and a thermometer 5. Reactants and monomers can be added to the reaction mixture 3 through an inlet 6 either continuously or in portions; there are means (not shown) to meter the amount of reactant or monomer added and to exclude atmospheric air. Other additions, e.g. of initiator or inhibitor, buffer and the like, can be made by hypodermic syringe through a vaccine cap 7.

A volatile liquid is present in the enclosed jacket 8 between the reaction vessel 2 and the inner wall of the Dewar flask 1. A small heater 9 is provided to heat this liquid to its boiling point before the reaction commences, and also to provide background heating so as to compensate for heat losses. Vapour from the liquid can escape through a duct 10 with heated walls, to be condensed in a condenser 11 and collected in a burette 12 where its volume can be measured at any time. From the burette the liquid may be returned periodically into the jacket 8.

The liquid used to measure the heat of the reaction in this way can be any stable non-corrosive liquid whose boiling point under jacekt conditions is at or slightly below the desired temperature for the reaction. Its precise identity is immaterial in principle becuse it takes no direct part in the reaction, and suitable liquids may readily be ascertained by scrutinizing published tables of substances arrange in order of boiling point.

The walls of the reaction vessel are made of an inert material which is preferably a good conductor of heat, e.g. aluminium or stainless steel or another unreactive metal. Glass is suitable on smaller scale.

The external thermal insulation is conveniently a vacuum flask (as described above with reference to FIG. 1) for laboratory work, or there may be a second outer jacket of the same liquid heated under reflux. For larger vessels it is convenient to have insulting material, e.g. polyurethane foam, wrapped round the outer wall of the reaction vessel and to compensate for any heat loss by means of a heater in the jacketing liquid; the heat supplied in this way should be just sufficient to keep the liquid at its boiling point when no reaction is taking place in the reaction vessel. This is illustrated by way of example in FIG. 2 in which the reaction vessel 21 is suspended within an outer glass cylinder 22 which is closed at the upper and lower ends by two mild steel plates 23 secured by three rods (of which one 24 is shown in the diagram). Domed nuts 25 are used on the tie rods, and between the glass and the steel plates are fibre washers 26 to prevent leakage The neck of the reaction vessel is held against a polytetrafluoroethylene grommet 27 in a hole in the upper steel plates by means of a collar 28 and screws 29. Secured to the upper surface of the same steel plate and held against the polytetrafluoroethylene grommet by a collar as before, is a distillation head 3. The vessel is fitted with a thermometer 31 and stirrer 32. The upper steel plate is also provided with an outlet 33 through which passes a narrow copper tube 34 having a number of small holes at its lower end to allow the passage of air to act as a bubble agitator.

In order to eliminate heat loss from the sides, the outer cylinder is fitted with a jacket heater 35 and a sheet of aluminium foil 36 insulated from the heater by a layer of polyethylene terephthalate film 37, and the whole system is enclosed in a polyurethane foam jacket 38.

In use the coolant is placed within the outer glass cylinder 22 where it is separated from the reaction mixture by the walls of the reaction vessel 21. During the reaction, the coolant is vaporized and may be condensed and measured in any suitable device attached to the distillation head 30. The condenser and burette of FIG. 1 may be used, or an automatic measuring device as described in Example 34 may be preferred where the quantities are large.

Where the reactants are relatively non-volatile the cooling liquid need not be housed in an external jacket but may be present in the reaction mixture itself. This liquid may then be used as a solvent for adding a reactant, especially when a solid reactant is to be added, or it may be used as a diluent during reactions in which the product precipitates during the process to form a slurry.

The invention can provide a process which lends itself very well to automatically controlled feeding. When using a large vessel and an automatic measuring device (as described below for example in Example 34), the level of the condensed coolant in the burette may be sensed electronically. The coolant is pumped from the burette at a rate sufficient to keep the liquid level constant and at the position dictated by the electronic sensing device, the pump being activated by this sensing device. This coolant pump is connected by a direct mechanical linkage to another similar unit which pumps monomer into the reaction vessel. The pumping capacities of the two pumping units are so chosen that the required amount of monomer is added to the reaction vessel for a given amount of condensed coolant pumped out of the burette. Adjustments to the measured heat to allow for changes in the temperature of the monomers may be made by alteration of this fixed level.

An altenative method of determining the rate of heat output according to the invention is to cause a cooling fluid to flow through and/or around the reaction vessel at a known rate, the evolution of heat during the reaction being determined by the rise in temperature of the cooling fluid. This method is particularly useful where large scale operation is carried out.

Figure 3:
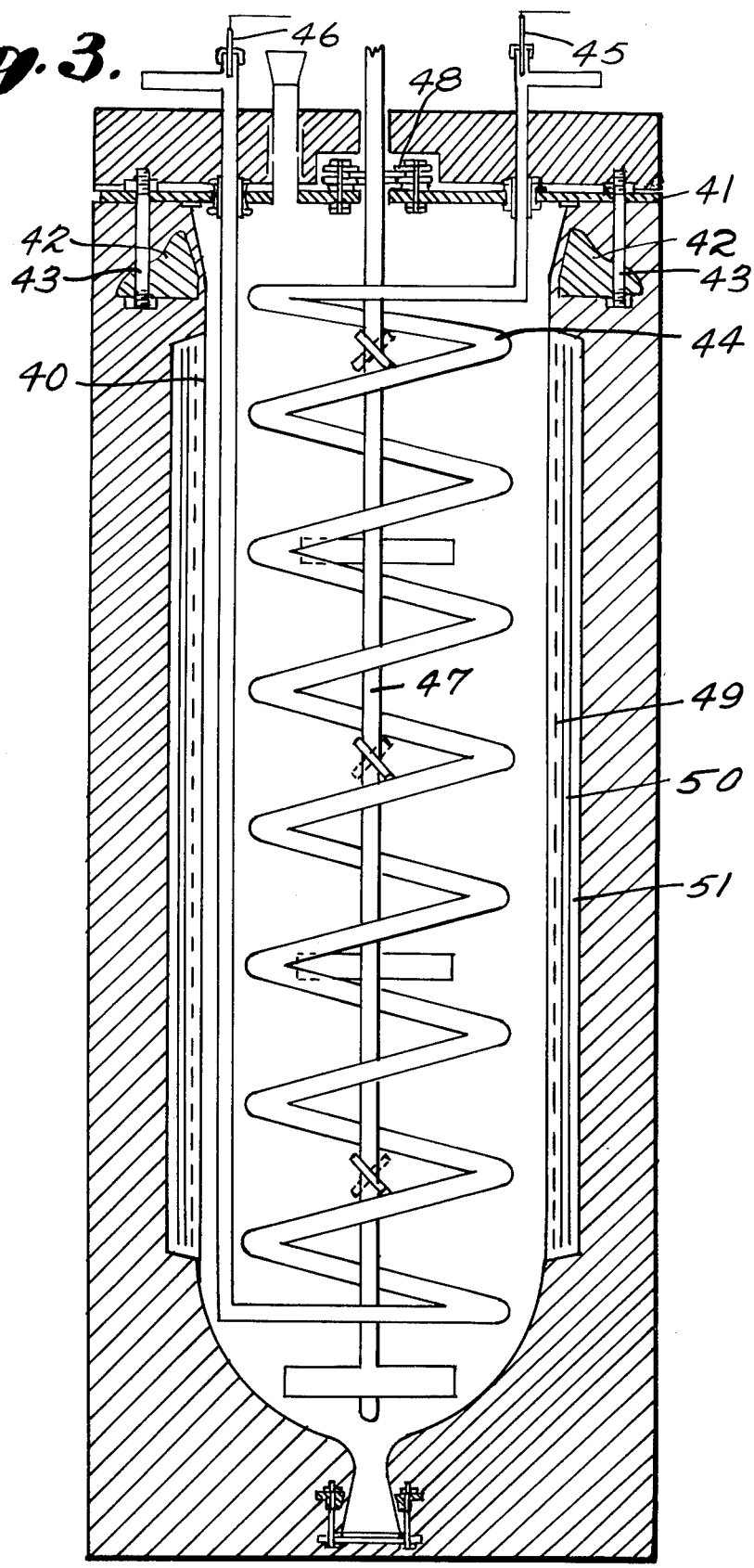
FIG. 3 shows in longitudinal section another type of apparatus, suitable for larger scale reactions, in which a cooled liquid is circulated at a known rate through a cooling coil in the reaction vessel; means are provided for continually measuring the difference between the inlet and exit temperatures of the cooling liquid.

FIG. 3 illustrates by way of example a particular in which a reaction vessel 40 is sealed at the lower end by a stainless steel cap, and is provided at the open end with a stainless steel plate 41, secured by a collar 42 and bolts 43. Within the reaction vessel is a cooling coil 44 fitted with two thermometers 45 and 46 at the inlet and exit respectively. A stirrer 47 is provided which passes through a gland seal 48 in which two polytetrafluoroethylene washers are inserted between two metal washers, and the assembly is clamped to the steel plate with a sealing washer interposed between them. The thermal insulation comprises a heater jacket 49 which is surrounded by a layer of polyethylene terephthalate film and a layer of aluminium foil 51. The whole system is encased in a polyurethane foam.

In use, a cooling liquid such as water is circulated at a known rate through the cooling coil, and the rise in temperature of the liquid is determined by the difference in temperature between the two thermometers 45 and 46. From the rate of heat output is determined the rate at which the monomer or monomers are to be added to the reaction mixture as before.

The use of a cooling coil also readily lends itself to the control of automatic monomer feed. The pump used for circulating the cooling liquid may be coupled to the pump used for the monomer feed. If the rate of flow of the cooling water is then automatically adjusted to maintain a constant difference in temperature between the two thermometers, the rate of feeding the monomer will be similarly adjusted.

For carrying out the invention in controlling the rate at which the monomers are fed, a knowledge of the heat of the reaction is necessary since it is from the rate at which the heat is produced that the rate of reaction is determined. Data of this type are uncommon for copolymerization reactions, but in general it is sufficient to calculate a value from the heats of homopolymerization which have been published for all common monomers or can be calculated theoretically. They may even be guessed reliably by comparison of the chemical structure of the monomer in question with similar molecules of known heats of polymerization.

The total heat evolved if an entire batch container two monomers is converted completely to copolymer is presumed to be equal to the sum of i. the heat of polymerization of the first monomer (heat per mole times number of moles polymerized); and ii. the heat of polymerization of the second monomer, and similarly if there are three or more monomers.

The simple relationship between heat of copolymerization and composition presumed by the use of this sum is not strictly true and deviations from it can be expected. The sum, however, is adequate for use with a first experiment because subsequent analysis of the copolymer product gives an immediate indication of how much in error the assumed heat of copolymerization is and empirical corrections can then be made in subsequent experiments. In any case, errors arise from other sources and it is convenient to eliminate these by calibration using an empirically determined apparent heat of copolymerization to suit the particular apparatus.

The temperature at which the reaction is carried out according to the invention may be quite independent of the method chosen for measuring the heat produced; an experimentally determined optimum temperature for the reaction may therefore be used.

The method of the invention in useful for making copolymer under conditions of free-radical catalysis from any polymerizable or copolymerizable monomer such as a monomer in which the functional ethylenic bond is conjugated to an aromatic ring, i.e. an aromatic olefine, as for example in styrene, α-methylstyrene, o-methyl styrene, m-methylstyrene, p-methylstyrene, 2,5-dimethylstyrene, p-methoxystyrene, p-dimethylaminostyrene, p-acetamidostyrene m-vinylphenol, p-trimethylsilystyrene, ar-dibromostyrene, 1-vinylnaphthalene, acenaphthylene, 3-vinylphenanthrene, 2-vinylthiophene, indene, coumarone, N-vinylcarbazole or a vinyl pyridine (e.g. 2-methyl-5-vinylpyridine); or a monomer such as vinyl acetate or other vinyl esters, butadiene, isoprene, ethylene, propene, isobutene, 4-methylpentene-1, vinyl chloride, vinylidene chloride, vinyl fluoride, vinylidene fluoride, hexafluoropropene, tetrafluoroethylene, chlorotrifluoroethylene; or an electron-deficient vinyl monomer, for example acrolein, methacrolein, acrylonitrile, methacrylonitrile, α-acetoxyacrylonitrile, acrylic acid and methacrylic acid and esters thereof, cinnamonitrile, chloroacrylonitrile, fumaronitrile, maleonitrile, maleic anhydride, maleimide and its N-substituted (particularly its N-aryl) derivatives, and also alkyl vinyl and alkyl isopropenyl ketones, ethers and sulphones, e.g. vinyl methyl ether, vinyl ethyl ether and vinyl methyl sulphone. The method is useful in the preparation of random copolymers containing units derived from monomers which when mixed would tend to form a copolymer of a composition differing from that pof the monomer mixture, e.g. by exhibiting a strong tendency to form an alternating copolymer. The method may for example be used in copolymerizing mixtures of vinyl chloride and N-aryl maleimides as disclosed in commonly assigned U.S. Pat. No. 3,666,720 of Nield and Rose, which also described terpolymers in which a third monomer such as acrylonitrile or styrene is polymerized with vinyl chloride and N-aryl maleimide. As examples of copolymers that are usefully made according to the invention, there may be mentioned acrylonitrile copolymers, vinylidene chloride copolymers and vinyl chloride copolymers. The method is also useful for polymerizing such monomers in the presence of a polymer substrate, e.g. a diene rubber, when a graft copolymer may be formed with a randomly copolymerized superstrate.

The method of the invention is particularly suitable for the production of homogeneous copolymers of acrylonitrile and at least one aromatic olefine. Owing to the great ease with which aromatic olefines copolymerize in the presence of a high proportion of acrylonitrile, the portion of copolymer formed at the beginning of the reaction tends to be enriched with the aromatic olefine at the expense of the portion of copolymer formed at the end of the reaction; and the latter tends therefore to have the disadvantageous properties of crystalline polyacrylonitrile and a heterogeneous copolymer is obtained unless precautions are taken to maintain a constant ratio of monomers in the reaction medium by feeding the monomers (or at least the aromatic olefine) into the reaction medium throughout the course of the polymerization. British patent specification No. 663,268 (corresponding to U.S. Pat. No. 2,559,155) described a method of doing this, in which acrylonitrile and styrene or α-methylstyrene are added to an aqueous medium at the reflux temperature, the aqueous medium containing a water-soluble peroxy catalyst and a dispersing agent, and the rates of addition being such as to maintain a substantially constant reflux temperature in the aqueous medium.

British patent specification No. 663,268 also states that copolymers of 40% to 80% by weight of the acrylonitrile are useful in the preparation of injection-moulded articles by reason of the useful flexural and tensile strengths accompanied by unusual clarity. These limits correspond to a range of molar ratios of 1.3:1 to 7.9:1 for units of acrylonitrile and styrene and of 1.5:1 to 8.9:1 for units of acrylontrile and α-methylstyrene. Several examples of such copolymers are described in that specification. However, no information is given as to the molecular weight of these products, and compression-moulding is the only technique of fabrication to which they are subjected, but on repeating the experiment exactly as described in Example 3 of that specification the copolymer produced has been found to have a reduced viscosity of 5.14 (measured on a solution of 0.5 g of the copolymer in 100 cm$^3$ of dimethylformamide at 25° C) and a melt viscosity of 23 kP (measured at 260° C and a shear rate of 1000/second).

For the production of random copolymers from mixtures of monomers which have very unequal rates of polymerization, as for example in the production of uniform copolymers of acrylonitrile and an aromatic olefine such as styrene where acrylonitrile is in the major molar proportion and styrene is the more reactive monomer, it is necessary to add the more reactive monomer (alone or mixed with other monomer) to the reaction mixture at the rate at which the reaction proceeds. When both monomers are being fed to the reaction mixture, it is possible to feed a monomer mixture which has the same composition as the copolymer being formed. This is then fed to the reaction mixture at the rate of polymerization. The amount and composition of the monomer in the reaction mixture thereby remains constant. When only the more reactive monomer is being fed, it is added to a diminishing amount of polymerising monomer mixture at such a rate that the composition is maintained constant. The amount of the more reactive monomer to be added at any time during the reaction may readily be determined once the amount of heat liberated has been calculated by the following relationship:

| amount of olefine added | heat liberated |
| --- | --- |
| total amount of olefine to be fed | heat liberated by complete copolymerization of all the monomers |

Figure 4:
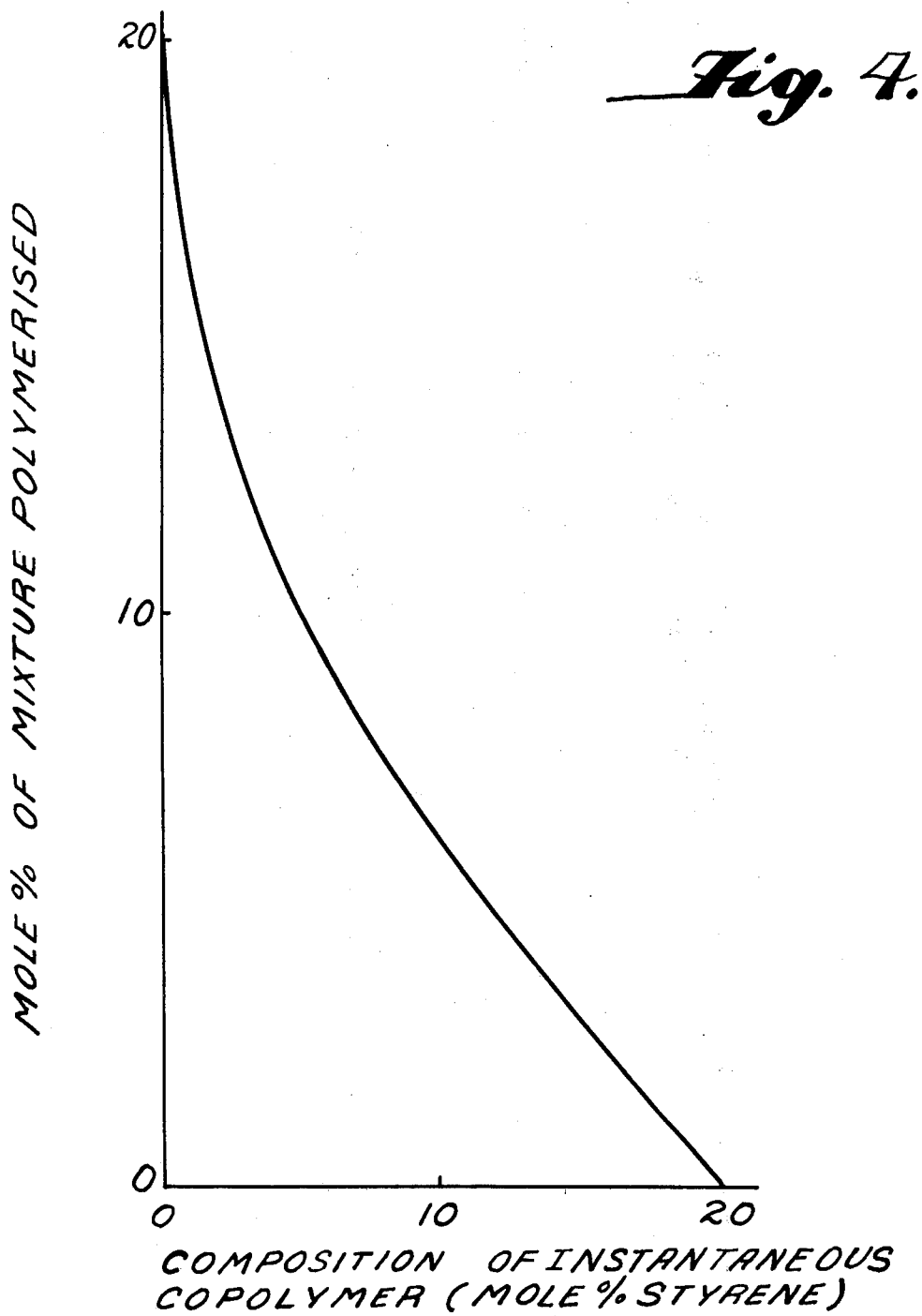

Since each of the monomers enters the copolymer at a different rate, there should be no substantial delay after the reaction has started before the monomer feeding is commenced, because the monomer ratio in the reaction mixture will immediately start to change. For example, an acrylonitrile/styrene reaction mixture containing 1.3 mole % of styrene initially forms a copolymer containing 19.6 mole % of styrene. If no more styrene is added the mixture will rapidly become depleted in styrene so that a copolymer containing only 18.6% of styrene will be formed when only 0.5 mole % of the aggregate initial charge has been polymerized. This is shown by FIG. 4 of the accompanying drawings which presents the relationship between the composition of an acrylonitrile/styrene monomer mixture and the composition of the acrylonitrile/styrene copolymer being formed from a mixture of that composition under conditions of free-radical catalysis.

The composition of the copolymer produced depends very closely on the concentration of monomers in the polymerizing mixture, and this is reflected in the amount of each monomer needed in the initial charge. Published data permit this to be calculated approximately, but empirical refinements may be required until the copolymers have optimum physical properties, evidenced for example by giving good clear compression mouldings.

To produce 100 g of a random copolymer of acrylonitrile and styrene, for example, the amount of styrene to be mixed with the whole required amount of acrylonitrile in the initial charge has been determined empirically for copolymers of various styrene content, and the results are shown in the following table (the rest of the styrene being added continually during the polymerisation).

| Styrene in Initial change | Acryle nitrile | Styrene in Copolymer |
|---|---|---|
| 2.1 cm³ | 93.2 cm³ | 15 mole % |
| 2.4 cm³ | 88.6 cm³ | 17.5 mole % |
| 2.5 cm³ | 84.0 cm³ | 20 mole % |
| 4.0 cm³ | 68.1 cm³ | 30 mole % |

The rate of feed of the monomers to the reaction vessel according to the invention is such as to maintain a constant ratio of the monomers in the reaction mixture. In these circumstances it is not possible to control the reaction rate by adjusting the rate of monomer feed, and where control of the reaction rate is required another method must be used. For example the reaction rate may be slowed down by adding a small amount of a poison or chain-terminating agent (e.g. sodium dimethyldithiocarbamate for controlling a poymerisation catalysed by free radicals).

With random copolymers of acrylonitrile and aromatic olefine, it has been found that while the melt viscosity increases steadily with increasing molecular weight (the molecular weight being represented in terms of reduced viscosity), the impact strength approaches a maximum beyond which it rises little or not at all with further increase of molecular weight. This point is reached at a reduced velocity below 1.2 when the molar ratio (acrylonitrile to aromatic olefine) is less than 4:1, and at a reduced viscosity below 1.8 when the molar ratio is 4:1 or more but less than 6:1.

The magnitude of this maximum impact strength depends on the composition of the copolymer, higher strengths being achieved with higher molar ratios of acrylonitrile to aromatic olefine. The lowest molecular weight at which a copolymer of a given composition displays its maximum impact strength corresponds to a certain melt viscosity, and this minimum melt viscosity also rises with the molar ratio of acrylonitrile in the copolymer.

These discoveries are illustrated by FIGS. 5 to 10 of the accompanying drawings.

Figure 5:
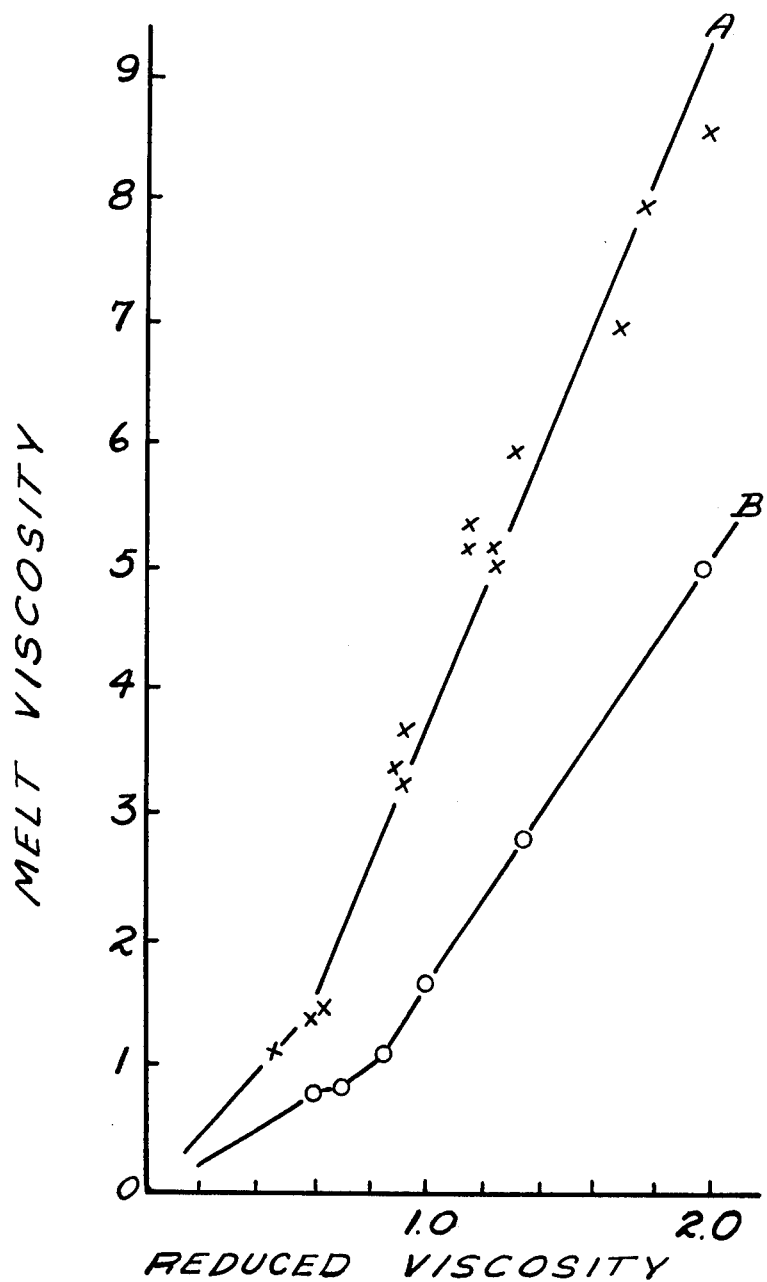

FIG. 5 is a graph of melt viscosity against molecular weight for acrylonitrile-styrene copolymers of the invention having a molar ratio of 3.65:1 (upper curve) and similarly uniform but equimolar acrylonitrile-styrene copolymers (lower curve). The melt viscosity was measured at 260° C at a shear rate of 1000/second and is given in kilopoises. The average molecular weight is represented in terms of a reduced viscosity in a 0.5% solution in dimethylformamide at 25° C.

Figure 6:
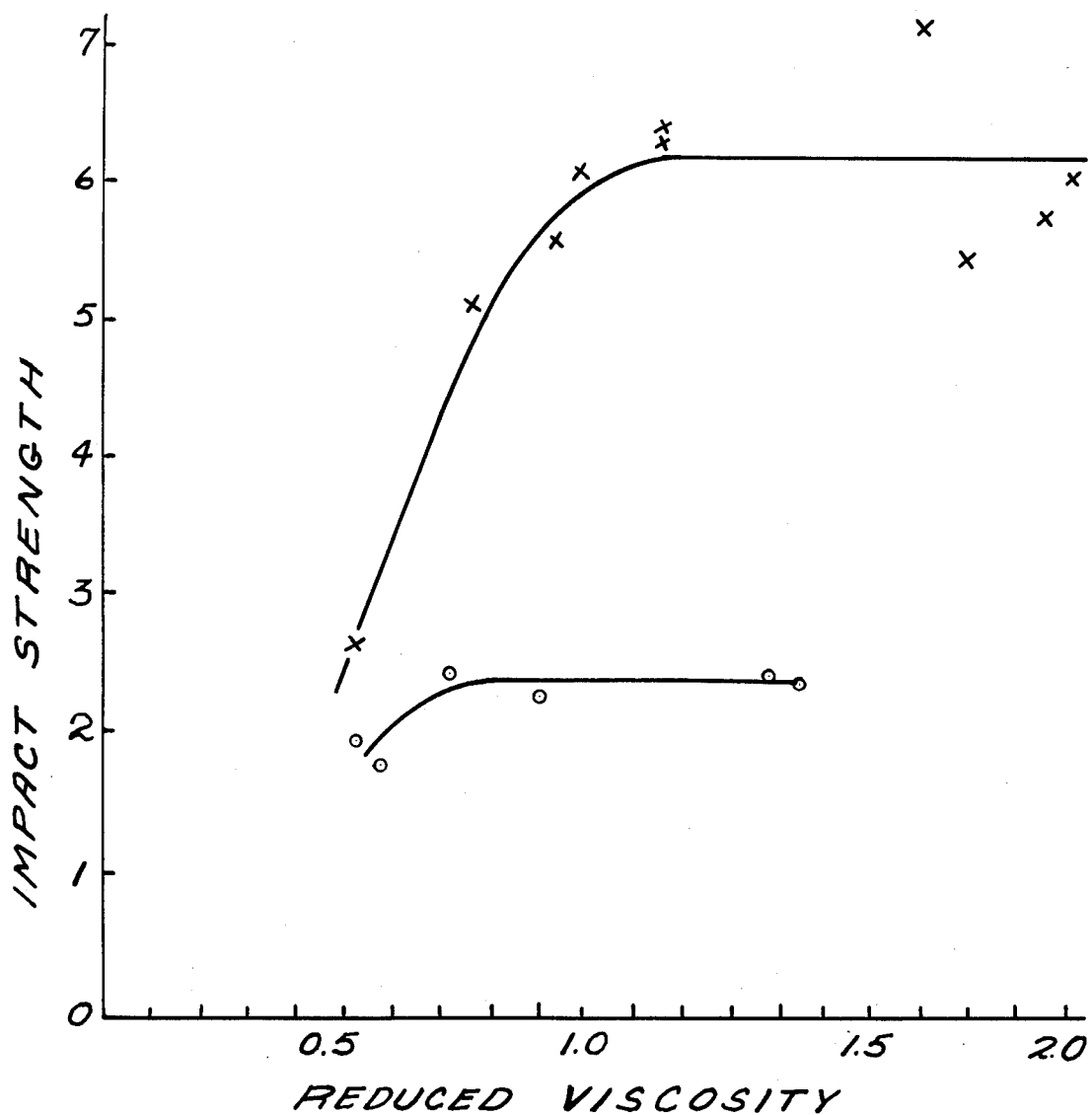

FIG. 6 is a graph of impact strength against reduced viscosity for the same two series of copolymers, the upper curve relating to the high acrylonitrile copolymer. The impact strength was measured at 20° C on an unnotched specimen 0.9 cm wide and 0.3 cm thick, resting horizontally (with the narrow face uppermost) against two supports 3.8 cm apart. The specimen was struck centrally on the wide face by a horizontaly moving pendulum falling from 30 cm, with more than sufficient energy to break the specimen. From the residual energy of the pendulum, the energy required to break the specimen was calculated and then divided by the effective volume (1/9 × 3.8 × 0.9 × 0.3 cm³). The resulting value (expressed in joules/cm³) represents the energy required to cause cracks to form in the material.

Figure 7:
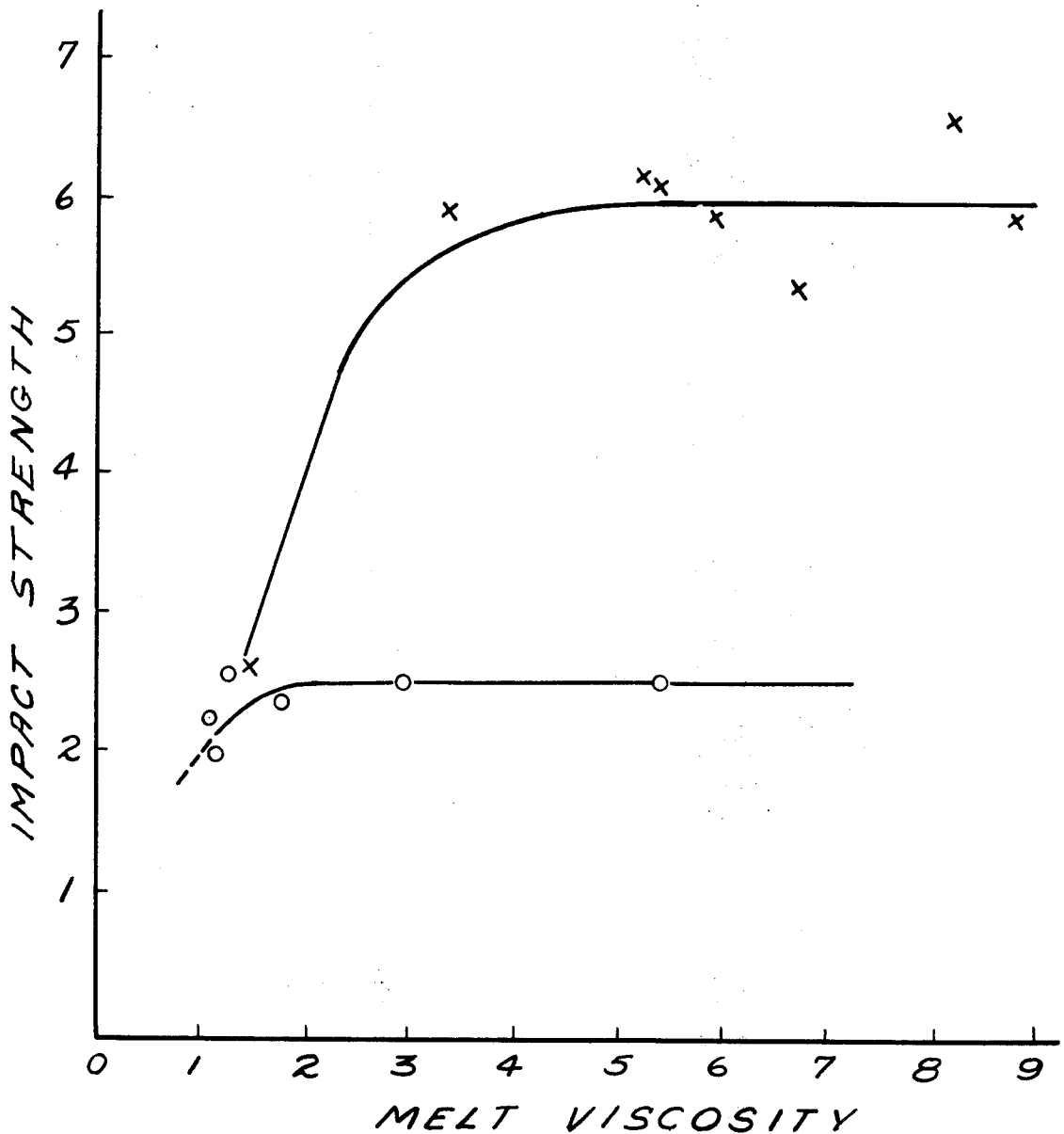

FIG. 7 is a graph of impact strength against melt viscosity for the same two series of copolymers based on the data of FIGS. 5 and 6, the upper curve again relating to high acrylonitrile copolymers. The existence of a minimum melt viscosity for maximum impact strength may be seen.

Figure 8:
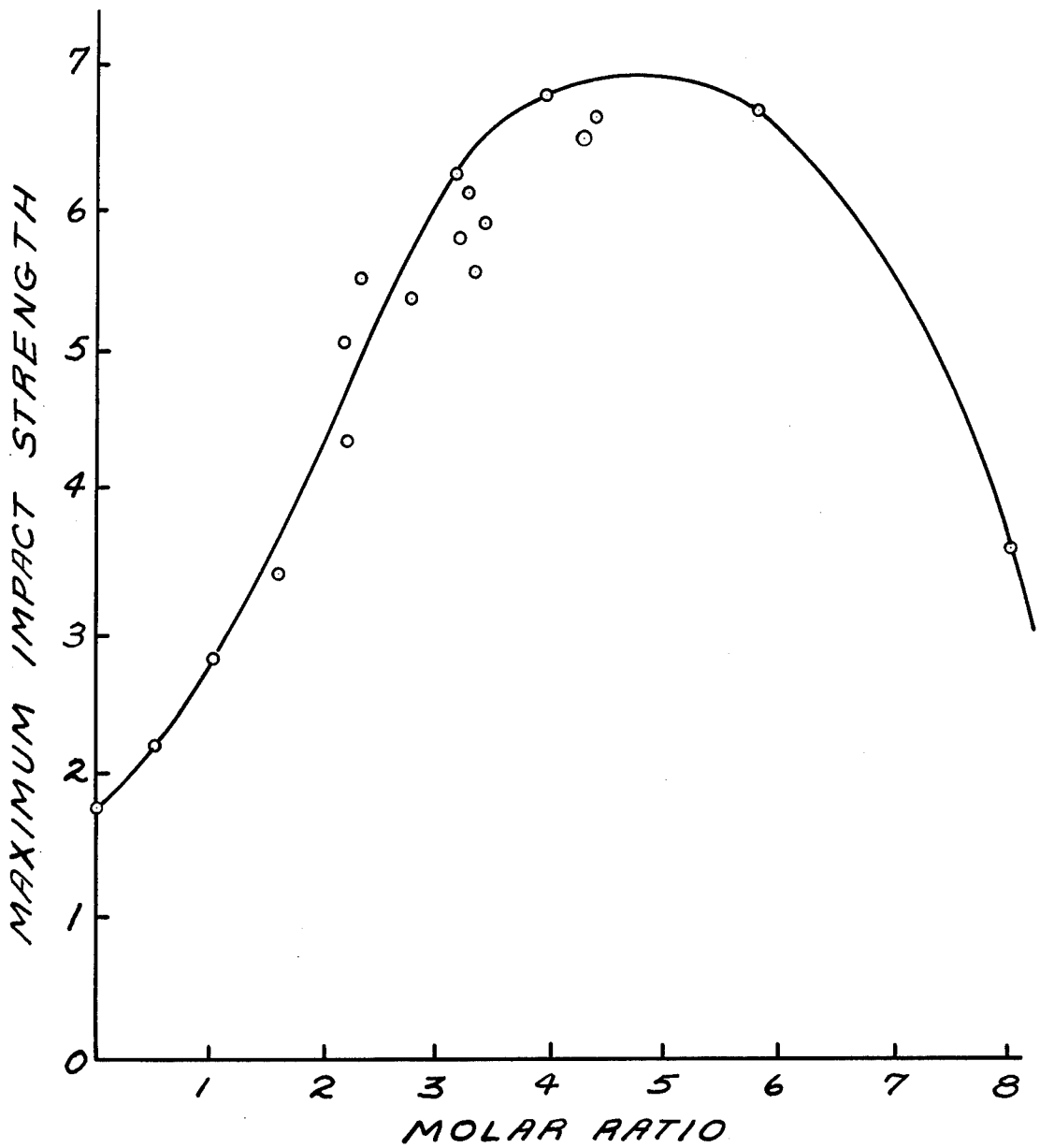

FIG. 8 is a graph of maximum impact strength against molar ratio for uniform acrylonitrile-styrene copolymers.

Figure 9:
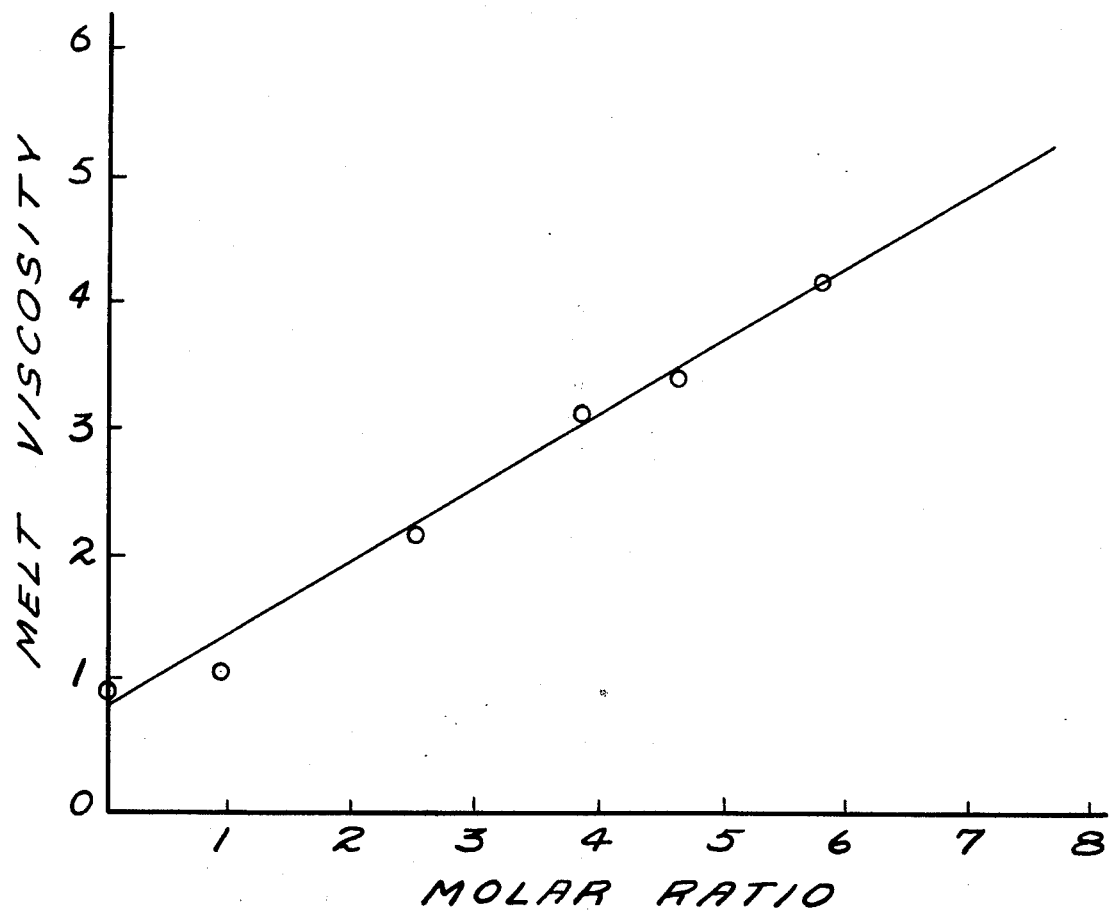
Figure 10:
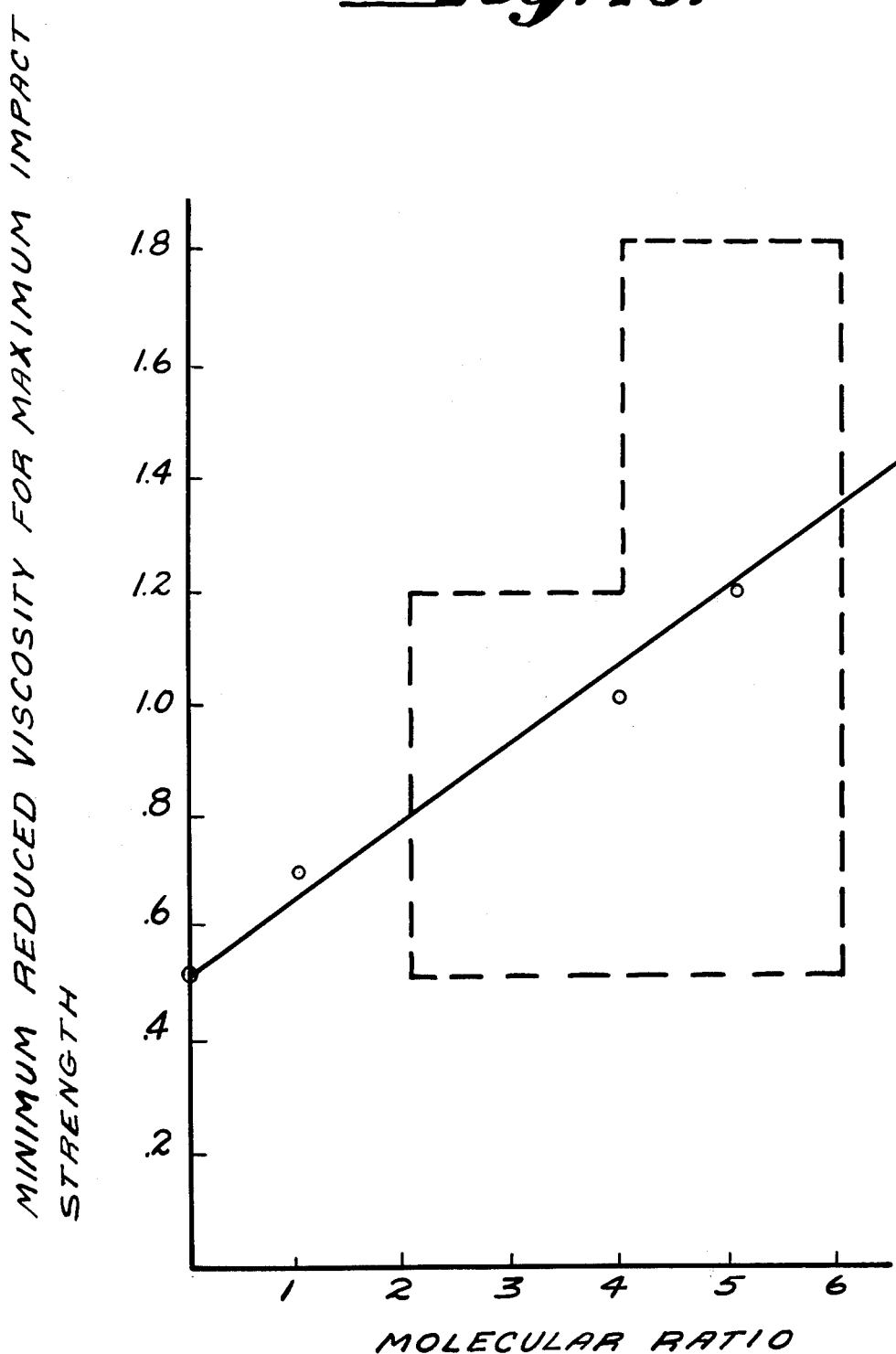

FIG. 9 is a graph of melt viscosity against molar ratio showing the mininum melt viscosity at which acrylonitrile-styrene copolymers of each molar ratio develop their maximum impact strength. The minimum reduced viscosity is obtained in like manner: FIG. 10 shows the relationship between the minimum reduced viscosity for maximum impact strength and molecular ratio, and by the dotted line shows the extent of the selection claimed.

The impact strength is much more dependent on the molar ratio of acrylonitrile than might have been predicted from the data given in the example of British patent specification No. 663,268; as shown in FIG. 8 the impact strength rises steeply but falls again as the molar ratio of acrylonitrile rises above about 6:1. The minimum melt viscosity for maximum impact strength, however, continues to rise as the copolymer approaches the composition of polyacrylonitrile. Thus the molar composition as well as the molecular weight needs careful selection if the copolymer is to have the desired mechanical properties. The data for the accompanying graphs were obtained from compression-moulded samples, these being more reproducible with respect to change in mould design. For injection-moulded samples the maxima of the graphs will occur at lower acrylonitrile compositions due to strain in the mouldings. It is well known that to eliminate strain the injection moulding temperature must be increased with rising melt viscosity. FIG. 9 shows how the melt viscosity rises with increasing molar ratio. However, as the acrylonitrile proportions of the copolymer increases, so the melt stability decreases thereby limiting the temperature at which injection moulding can take place. This value will vary slightly with the design of the injection mould and machine, but the effect is that for the majority of injection moulding machines at present in use, strain becomes increasingly important when the melt viscosity rises. The preferred molar ratio will therefore depend on the processing technique used. For compression moulding and extrusion (where strain is not so inherent in the product) the preferred molar ratio of acrylonitrile to styrene lies within the range 3.5:1 to 5:1, particularly about 4:1, and for injection moulding the preferred molar ratio lies within the range 2:1 to 4:1.

For injection moulding of the copolymer itself, a reduced viscosity (measured as described above) of less than 1.0 is usually preferable. For the preparation of films, however, a somewhat higher molecular weight as well as a higher molar ratio may be desirable.

In accordance with the present invention, a film is made of a homogeneous copolymer of acrylonitrile (50–98 mole %) and at least one conjugated aromatic olefine (2–50 mole %) in which the units of aromatic olefine are randomly distributed in the polymer molecules The optimum proportion of the monomer units in the copolymer depends on the properties required. The copolymer becomes increasingly difficult to extrude as the proportions of acrylonitrile increases, particularly where the proportion of acrylonitrile is greater than 90 mole %. For ease of extrusion, copolymers containing not more than 80 mole % are preferred. Thermal instability, which is dependent on the length of uninterrupted sequences of acrylonitrile units, also increases with increasing proportions of acrylonitrile, and on this account, copolymers containing not more than 80 mole % acrylonitrile (i.e. a molar ratio of acrylonitrile units to units of aromatic olefine of 4:1) are preferred; even greater thermal stability being provided in copolymers containing 66 mole % acrylonitrile (i.e. a molar ratio of acrylonitrile units to units of aromatic olefine of approximately 2:1). However, progressively reducing the acrylonitrile content below 80 mole % results in reduced strength, stiffness and resistance to chemical attack.

Thus where the principal requirements are ease of extrusion and good thermal stability the preferred copolymers are those containing 50–90 mole % acrylonitrile, particularly those containing 50–80 mole % acrylonitrile. Where the principal requirements are good strength, stiffness and resistance to chemical attack the preferred copolymers are those containing 80–98 mole % acrylonitrile. Where the ease of extrusion and thermal stability are required to be balanced with good strength, stiffness and resistance to chemical attack, the preferred copolymers are those containing 66–90 mole % acrylonitrile, and more particularly 80–90 mole % acrylonitrile or 66–80 mole % acrylonitrole depending on the balance of properties desired.

The conjugated aromatic olefine is selected from these of the formula

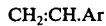

and also acenaphthylene, indene and coumarone. In this formula R is hydrogen or methyl and Ar is an optionally ring-substituted residue of aromtic character having not more than 3 rings and each substitutent (if any) having not more than 4 carbon atoms. Styrene is conveniently the predominant aromatic olefine in the copolymer.

The degree of polymerization is preferably such that the copolymers for the films of this invention have molecular weights equivalent to reduced viscosities of at least 0.5 but not more than 3 (preferably between 1 and 2), as measured on a solution of 0.5 g of the copolymer in 100 cm$^3$ of dimethylformamide at 25° C.

In order to obtain such low reduced viscosities, steps must be taken to control the molecular weight during polymerization, and this may be readily achieved by the addition of chain-transfer agents, for example thiols such as butane-1-thiol and octane-1-thiol. The chain-transfer agent may all be added at the start of the reaction but in order to obtain a more even distribution of molceular weights it is preferable to add a portion to the initial charge, and then to feed further quantities with the monomer feed.

For ease of fabrication, it is preferred to use copolymers having a melt viscosity of less than $10^5$ and preferably less than $10^4$ poises at 260° C when measured under a constant shear stress of $10^7$ dynes/cm$^2$. Desirably, the melt viscosity at 260° C is less than about 50 kP at a shear rate of 100/s and less than about 10 kP at a shear rate of 1000/s.

The homogeneous copolymers of the presennt invention, and in particular those of acrylonitrile and at least one conjugated aromatic olefine in molar ratio 2:1 – 6:1, may be modified by incorporating lubricants, plasticisers, stabilisers, optical brighteners and fillers such as colloidal rubber particles or glass fibres before fabrication into shaped articles.

A major potential use for a copolymer of the invention is as the resin component of a blend with a graft having a rubber substrate. Any compatible graft material may be used. Grafts containing a polybutadiene substrate and a superstrate of acrylonitrile/isobutene (as described in commonly assigned U.S. application Ser. No. 236,976 of Mathews, Nield, Rose and Vincent, filed on 22 Mar. 1972) or homogeneous acrylonitrile/styrene copolymer superstrate having a high percentage of acrylonitrile (as described in commonly assigned U.S. application Ser. No. 107,563 of Hendy, Mathews, Nield, Rose and Vincent, filed on 18 Jan. 1971) are very suitable. A blend as described in generally tougher than the untreated resin of the present invention, and tends to have, for example, a higher impact strength. It is important when blending the present copolymers to use a graft which is compatible therewith if the required degree of toughness is to be obtained.

Properties of the copolymer may also be modified by copolymerizing one or more additional ethylenically unsaturated monomers (copolymerizable using free-radical catalysts) with the acrylonitrile and aromatic olefine. Such a copolymer may thus contain, in addition to acrylonitrile and aromatic olefine, a minor amount (i.e. less than the amount of aromatic olefine) of units of other ethylenically unsaturated compounds. These additional monomers will normally represent only a small percentage of the total polymer, i.e. less than 10% and usually less than 5% molar, and generally may be added in entirety to the initial charge. However, where the rate of copolymerization of the added monomer is high compared with that of acrylonitrile (particularly when it is itself a conjugated aromatic olefine), or where relatively large quantities are involved, it may be preferable to add the modifying comonomers with the monomer feed.

For instance the polymer may be made flame-resistant by using dibromostyrene as part or all the aromatic olefine; in this case the dibromostyrene would be added to the reaction vessel with the monomer feed. Improved dyeability may be imparted by adding as a comonomer a few percent of vinyl pyridine. The processability may be improved by adding to the initial charge a few percent of a long-chain alkyl vinyl ether, e.g. cetyl vinyl ether.

The softening point may be raised by incorporating as a comonomer preferably up to 10% molar (based on the combined weight of acrylonitrile and aromatic olefine) of at least one copolymerizable ethylenically unsaturated monomer selected from acenaphthalene (when used in addition to another predominant aromatic olefine), N-vinyl carbazole and its derivatives, maleimide and its N-substituted derivatives and morbornene and its derivatives. The preferred comonomers are those having the ethylenic unsaturation in the ring, thereby introducing the ring into the polymer chain. Of these, the maleimides, particularly N-aryl substituted maleimides, are preferred as they are not only very effective in the present invention, but they are also readily obtainable from a $\alpha,\beta$-ethylenically unsaturated cis-$\alpha,\beta$-dicarboxylic acid and an aniline. A process for preparing N-aryl maleimides in good yield is described in commonly assigned U.S. Pat. Nos. 3,338,919 and 3,431,276 of Nield. Many different anilines are readily available and yield N-aryl maleimides that may be used as comonomers for the novel copolymers. The aryl substituent is derived from an aromatic hydrocarbon or heterocycle in which one or more of the hydrogen atoms may be replaced by other atoms or groups. Substituents containing active hydrogen atoms, however, are generally to be avoided because they may interfere with polymerisations catalysed by free radicals. The aryl groups that may be present in N-aryl maleimides include, for example, phenyl, 4-biphenylyl, 1-naphthyl, all the mono- and di-methylphenyl isomers, 2,6-diethylphenyl, 2-, 3- and 4-chlorophenyl, 4-bromophenyl and other mono- and di-halophenyl isomers, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyls, 2-methoxy-5-chlorophenyl, 2-methoxy-5-bromophenyl, 2,5-dimethoxy-4-chlorophenyl, 2-, 3- and 4-ethoxyphenyl, 2,5-diethoxyphenyl, 4-phenoxyphenyl, 4-methoxycarbonyl-phenyl, 4-cyanophenyl, 2-, 3- and 4-nitrophenyl and methylchlorophenyl (2,3-, 3,4-, 2,5- and 4,3-isomers). The N-(o-substituted phenyl)maleimides are generally less coloured than the other isomers or the unsubstituted compounds any may therefore be preferred if a relatively colourless product is desired.

Norbornene and its derivatives are also of interest as they are ethylenically unsaturated cyclic compounds which are very readily prepared by a Diels-Alder addition to cyclopentadiene of, for example, acrylonitrile, vinylidene cyanide or methyl acrylate. Of the posible norbornene derivatives which are readily obtainable, borbornene, 5-cyanonorbornene and methylenenorbornane were found to raise the softening point, while with 5,5-dicyanonorbornene, 5,6-dicyanonorbornene, 5-methoxycarbonylnorbornene and 5-methyl-5-methoxycarbonylnorbornene no increase in softening point was observed. This is believed to be due to the double bond in these compounds being less reactive in free radical copolymerization, and the monomers failing to become incorporated into the chain.

These additional monomers may generally be added in entirety to the initial charge. However, where the reactivity of the added monomer is high compared with that of acrylonitrile (particularly when it is itself a conjugated aromatic olefine, e.g. acenaphthylene), it is preferable to add the modifying comonomer with the monomer feed.

Films may be prepared from the copolymers by any process normally used in the art of shaping thermoplastic material; suitable methods include compression-moulding, melt-extrusion, calendering, or casting from a melt, from a solution of the polymer in a suitable solvent, for example acetone or dimethylformamide, or from latex. Where the film is formed from the copolymer by moulding or extrusion, temperatures of at least 150° C are generally required to obtain the material in a sufficiently mobile form. The use of temperatures above 300° C may result in chemical alteration of the polymer, evinced as a deepening yellow colour and probably caused by intramolecular ring-closure between adjacent acrylonitrile units in the polymer chain. Such chemical alteration, however, may sometimes be desirable. It may also be desirable to include in the film-forming compositions other ingredients such as fillers, stabilizers, lubricants, slip and mould-release agents.

In order to produce a film which has a significantly improved balance of mechanical properties, it is desirable to orient it by stretching within a limited range of temperatures and then cool it in the stretched condition. If the stretching temperature is too low, necking may occur and voids may be formed in the film, (although voids may be desired for their decorative effect, e.g. in ribbons of the film). The lower limit is close to the glass transition of the film which for the preferred copolymrs is at least 100° C. As the stretching temperature is increased further above the glass transition, the improvement in mechanical properties becomes smaller for a given degree of stretch (draw ratio); that is, "flow" occurs,, so that much of the stretch would not be recovered on heating above the glass transition. For this reason it is desirable to keep the drawing temperature as low as possible depending on the rate of stretching. The optimum drawing temperature will depend on the particular copolymer used, the rate of draw and the draw ratio, and may most conveniently be found by experiment. However, approximate parameters may be given based on homogeneous acrylonitrile/styrene copolymer containing about 20 mole % of randomly distributed styrene units. The film may be drawn with draw ratios ranging from about 2:1 to about 10:1, although for most purposes draw ratios of up to about 7:1 may be sufficient. At temperatures above about 140° C the amount of orientation obtained rapidly diminishes as the viscosity decreases and temperatures up to about 130° C are therefore preferred. Although films cast from solutions have been drawn at 90° C, for most films a temperature of at leat 100° C is preferred Temperatures within the range 100 – 120° C appear to be particularly suited to solvent-cast film of the copolymer while temperatures within the range 120°–130° C are generally preferred for extruded film. For example, extruded films from homogeneous copolymers containing 20 mole % randomly dispersed styrene units have been uniaxially drawn at temperatures of 120°–130° with draw ratios ranging from 2:1 up to 7:1. Solvent-cast films from similar material when cast from a solution of the copolymer in acetone have been drawn at 110° C with a draw ratio of 9:1, and when cast from a solution in dimethyl-formamide they have been drawn at 90° C with a drw ratio of 5:1. Draw rates of the order of 100% per second have been found convenient for use at temperatures within the above ranges.

The films may be stretched by any suitable process, the method used depending largely on the process used for forming the film. For example, a film shaped by extrusion through a slot orifice may be cooled to the stretching temperature and passed through two sets of pinch rolls, the last rotating faster than the first. The degree of orientation will depend upon the relative rotational speeds of the two sets of rolls and the temperature of the films. This process achieves stretching in only one direction and the strength of the film is increased solely in that direction.

Stretching in two directions may be sequential or simultaneous. One suitable method for sequential orientation is to extrude the film through a slot orifice, draw it longitudinally by a pinch-roll system, and then draw it laterally by means of pairs of clamps which are attached to the edges of the film and which are arranged to move apart as the film is led forward. The film may be heated during the stretching steps by passing it over a heated roll or by means of hot inert gases or liquids or by infra-red heating.

A convenient method for orienting a film in two directions simultaneously is to extrude the molten polymer through an annular orifice to give a tube and to draw the tube lengthwise by flattening it and passing it through two sets of nip rolls, the second rotating faster than the first. The tube is simultaneously stretched by internal gas pressure created within the tube between the two sets of nip rolls. The presence of the first set of nip rolls also prevents the point of expansion moving backwards to a position at which the tube after extrusion is still at a temperature at which flow would occur to the detriment of orientation. Another method is to extrude the film from a slit orifice, cool it and grip each side of the cooled film by a number of pairs of clamps. The clamps are then drawn along a path such that those in each pair diverge laterally from each other and the distance between adjacent pairs is also increased, thus stretching the film laterally and longitudinally.

The oriented films have improved tensile strength, are less brittle, and may exhibit greater resistance to attack by solvents and other chemicals than undrawn films.

Films made from homogeneous high acrylonitrile copolymers having randomly distributed aromatic olefine units are essentially strong and stiff (having a 1% secant modulus greater than 350 kgf/mm² for drawn film). They are inherently non-toxic and odourless, and these properties coupled with their high optical clarity and gloss make them very attractive for wrapping foodstuffs, e.g. potato crisps or confectionery. Their strength and clarity also make them suitable for use as a photographic film base.

Films made according to the present invention can be coated with thermoplastic heat-seal coatings or slip coatings or can be used in uncoated form, and they can be heat-sealed without coating making them generally useful as packaging materials. Compared with polyolefine films they are stronger and have a more chemically reactive surface, thereby making it easier to apply coatings. Heterofilms (in which two or more films are formed together) and laminates (in which two or more films are separately formed and subsequently laminated) may be formed with good adhesion between the layers without the need for a separate adhesive. For example a layer of polyolefine may be extruded onto the surface of the acrylonitrile copolymer film to provide a heatsealable surface, or the acrylonitrile copolymer may be used as a clear, glossy and attractive surface coating for other films.

The films, especially the uni- and bi-axially oriented films, may be used for many of the purposes for which films of ethylene, cellulose, vinylidene chloride copolymers and poly(ethylene terephthalate) have been used, particularly where they can be used in thicknesses of 5–5000 μm. In fact, the process of stretching the film as described hereinbefore provides a useful method of obtaining very thin film when this cannot readily be obtained by extrusion because of problems that arise from trying to force a highly viscous melt through a very narrow die, or by compression moulding because of variations in thickness of films thus formed; although very thin films can be obtained by casting from solvents.

The films may also be used, for example, for sachets; they may be laminated to other films such as polyethylene, poly(ethylene terephthalate), poly(vinyl chloride) and vinylidene chloride/vinyl chloride copolymers; and they may be metallised by vacuum metallising techniques or sputtering, and may be printed or dyed. The undrawn films may also be vacuum formed.

Where films according to the invention are stretched in one direction only, they are generally easy to fibrillate to form a network of fibrils. This may be achieved by any of the mechanical processes generally employed for fibrillating films from other copolymers. For example the films may be processed to form a twine by stretching to orient the molecules, bunching together a required number of strips of oriented film, and twisting them at least once while winding them on a bobbin as a twine, the twisting causing the film to fibrillate. Films fibrillated in this manner form twines with hairy surfaces and may produce knots having a greater resistance to slipping.

other known methods of mechanically inducing fibrillation in the drawn film may be employed. For example the drawn film may be slit or needle-punched to give a more uniform non-hairy mesh, or a mesh may be produced by the action of turbulent fluid flow on the drawn film. The film may generally be used where the fibrillated film is required, e.g. the manufacture of twine, or yarns for ropes.

Where a uniaxially oriented film is required which does not fibrillate so readily, it is necessary to stretch the uniaxially stretched film slightly in a direction perpendicular to the main stretch while still hot, i.e. at a temperature of 120°–130° C.

The following examples further illustrate the invention.

The reduced viscosity, melt viscosity and impact strength were measured as previously described.

The flexural strength was measured on specimens 51 mm long and 12.7 mm wide milled from a compression-moulded sheet 3 mm thick. The specimen rested on two supports 38.1 mm apart and midway between them a load was applied sufficient to bend the specimen at the rate of 457 mm/min. The flexural strength was calculated by multiplying the load at the moment of rupture by the factor: $(1.5)(38.1)/(12.7)(3)^2 = 0.5$ The yield stress was measured on specimens 76 mm long and 14 mm wide filled from a compression-moulded sheet 3 mm thick. The cross-sectional area across the centre of the specimen was reduced to 9 mm² by milling two slots (radius of curvature 31 mm) opposite each other in the long edges so that the narrowest width of the specimen was 3 mm. A tensile stress was then applied to the specimen sufficient to elongate it at the rate of 12.7 mm/min. and the stress at the yield point was recorded.

In the notched specimen impact test, carried out at 20° C, a specimen 60 mm long, 6.5 mm wide and 3 mm thick was given a 45° notch 2.8 mm deep (tip radius not greater than 0.25 mm) in the centre of one edge. It was supported between two supports 50 mm apart and struck centrally on the edge opposite the notch by a pendulum dropping from 300 mm with more than sufficient energy to break the specimen. From the residual energy of the pendulum the energy required to break the specimen was calculated and divided by the cross-sectional area of the specimen at the notch. The resulting value (expressed in joules/cm$^2$) represents the energy required to break the material.

The tensile test was carried out at +20° C on specimens 76 mm long and 14 mm wide milled from a compression-moulded sheet 3 mm thick. The cross-sectional area across the centre of the specimen was reduced to 9 mm$^2$ by milling two slots (radius of curvature 31 mm) opposite each other in the long edges so that the narrowest width of the specimen was 3 mm. A tensile stress was then applied to the specimen sufficient to elongate it at the rate of 12.7 mm/min. and the stress at the yield point (or brittle fracture was recorded.

EXAMPLE 1

A device as shown in FIG. 1 of the accompanying drawings was used to prepare a random copolymer of acrylonitrile and styrene containing 21.0 mole % of styrene units. The capacity of the Dewar flask 1 was about 3 dm$^3$, and that of the reaction vessel 2 about 1.6 dm$^3$.

Into the reaction vessel 2 was placed an initial charge consisting of distilled water (800 cm$^3$), acrylonitrile (334 cm$^3$), styrene (10 cm$^3$), butane-1-thiol (1.67 cm$^3$) and sodium dodecyl sulphate (4.0 g). (The acrylonitrile and styrene were commercially available substances used without further purification.) Air was removed and replaced by nitrogen. Isopentane (1 dm$^3$) was placed in the jacket 8 and the whole system was brought to the boiling point of isopentane at atmospheric pressure (28° C). An initiator comprising 5.0% w/v aqueous ammonium persulphate (7.0 cm$^3$) and 4.2% w/v aqueous metabisulphite (7.0 cm$^3$) was then fed into the reaction vessel through the vaccine cap 7 until the reaction started. When the temperature of the reaction mixture started to rise and isopentane began to distil, portions of 0.5–1.0 cm$^3$ of an air-free mixture of styrene and butane-1-thiol (0.56% w/v) were added linearly at the rate of polymerization, as calculated from the rate of distillation of isopentane. For 100% yield of a copolymer containing 20 mole % of styrene units, the total heat predicted was 467 kilojoules and the total distillate of isopentane predicted was 2220 cm$^3$, and the total amount of sytrene to be added was 136 cm$^3$ in addition to the initial charge.

Isopentane vapour was continuously condensed and collected in the burette 12. Two corrections were made to the observed quantity of isopentane distilled, because the isopentane in the burette was not preheated to its boiling point before being returned to the jacket 8, and also the temperature of the reaction mixture was somewhat higher than 28° C. The first correction was made whenever isopentane was returned from the burette to the jacket and was conveniently made by counting as 25 cm$^3$ of distilled isopentane each 24 cm$^3$ of isopentane returned, because the amount of heat required to heat 25 cm$^3$ of isopentane from 22° C to 28° C was about the same (50 calories) as that required to distil 1 cm$^3$ of isopentane at 28° C. The second correction involved adding to the total the amount of heat (conveniently expressed in cm$^3$ of distilled isopentane) required to raise the temperature of the reaction vessel contents from 28° C to whatever temperature it happened to be at; for the experiment here described, this amounted to about 24 cm$^3$ of distilled isopentane per degree Celsius above 28° C.

The course of the reaction is indicated by the following Table I, in which the time is in minutes after adding the initiator, the temperature is that of the reaction medium in °C, under "isopentane" is the total volume in cm$^3$ distilled (corrected for the return of distillate below its boiling point but not for the increased temperature of the reaction medium), and under "styrene" is the total volume (containing 0.56% w/v butane-1-thiol) in cm$^3$ added subsequently to the 10 cm$^3$ in the initial charge, and under "heat" is the total heat of polymerization in kilojoules.

TABLE I

| Time | Isopentane | Styrene | Temperature | Heat |
|------|------------|---------|-------------|------|
| 0    | 0          | 0       | 28.1        | 0    |
| 29   | 100        | 11.5    | 31.5        | 39   |
| 38   | 200        | 19      | 32.9        | 67   |
| 45   | 300        | 26      | 32.7        | 87   |
| 53   | 400        | 32      | 33.1        | 110  |
| 61   | 500        | 38      | 32.8        | 129  |
| 68   | 600        | 44      | 33.0        | 151  |
| 76   | 700        | 50.5    | 33.1        | 173  |
| 83   | 800        | 57      | 33.1        | 194  |
| 90   | 900        | 64      | 33.2        | 215  |
| 98   | 1000       | 71      | 33.2        | 236  |
| 113  | 1200       | 84      | 32.9        | 277  |
| 126  | 1400       | 94      | 33.2        | 320  |
| 133  | 1500       | 100     | 33.9        | 345  |
| 139  | 1600       | 105.5   | 33.6        | 364  |
| 145  | 1700       | 109     | 34.3        | 389  |
| 152  | 1800       | 118.5   | 33.1        | 404  |
| 163  | 1900       | 122     | 30.9        | 414  |
| 188  | 2000       | 126     | 30.0        | 430  |

Small amounts of 0.05% w/v aqueous sodium dimethyldithiocarbamate were added occasionally through the vaccine cap 7 when the temperature exceeded 33° C to keep the reaction under control. The reaction slowed markedly after 188 minutes and was then terminated by adding 5% w/v aqueous sodium dimethyldithiocarbamate (5 cm$^3$).

To isolate the copolymer latex from the reaction vessel was run into twice its volume of vigorously stirred ethanol at about 60° C. The coagulum tended to settle, after a little further heating as necessary, and the mixture was then cooled with stirring and the supernatant liquid finally decanted. The solid product was washed four times in succession by stirring in distilled water at 60°–70° C, and was then finally washed with cold methanol and dried in an oven at 70° C for 24 hours and then in a "fluidized bed" in an air stream at 80° C.

The copolymer formed in the above preparation after 40% of the monomers had been polymerized had a reduced viscosity of 0.86 at 0.5% in dimethylformamide at 25° C. The polymer (350 g) isolated after 90% of the monomers were utilized, had a reduced viscosity of 0.89, an impact strength of 6 J/cm$^3$, and a melt viscosity of 3 kP at 260° C and a shear rate of 1000/s.

EXAMPLES 2 – 10

With appropriate reduction or increase in the amount of styrene used, homogeneous copolymers of other compositions were made by the method of Example 1. Properties of products prepared as described in Example 1 are shown by the upper curve of FIGS. 5, 6 and 7 of the accompanying drawings; the properties of specific copolymers are shown in Table II below in order of decreasing molar ratio of acrylonitrile.

dodecyl sulphate (2.0 g) and butane-1-thiol (1.10 cm$^3$). Isopentane was the jacketing liquid as before, and 2.3 cm$^3$ was used of each of the initiator solutions described

TABLE II

| Example | | 2 | 3 | 4 | 5 | 6 | 7 | 8 | 9 | 10 |
|---|---|---|---|---|---|---|---|---|---|---|
| Styrene, mole % | | 15.1 | 18.6 | 19.8 | 20.4 | 22.4 | 22.6 | 22.8 | 25.0 | 38.2 |
| Acrylonitrile, molar ratio | | 5.62 | 4.38 | 4.05 | 3.90 | 3.47 | 3.43 | 3.39 | 3.00 | 2.31 |
| Reduced viscosity | | 0.97 | 0.58 | 0.56 | 0.86 | 1.08 | 0.89 | 1.08 | 0.83 | 1.20 |
| Melt viscosity (kP) | | 4.4 | 2.4 | 1.4 | 3.3 | 5.4 | 3.3 | 5.2 | 2.6 | 3.6 |
| Flexural strength (kgf/mm$^2$) | | 20.7 | | | | | 19.6 | | | 16.1 |
| Yield stress (kgf/mm$^2$) | | | | | | 11.0 | | | | |
| Impact strength (J/cm$^3$) | | 6–7 | | 2.7 | 5.4 | 6.1 | 5.8 | 6.2 | 5.4 | 5.0 |
| Vicat softening point (° C) | one-tenth | 102 | 97 | 100 | 101 | 101 | 103 | 99 | 102 | 106 |
| | full | 110 | 103 | 106 | 108 | 107 | 109 | 105 | 109 | 112 |

EXAMPLE 11

A device similar to that shown in FIG. 1 was used to prepare a random copolymer of acrylonitrile and α-methylstyrene containing 19.2 mole % of uniformly distributed α-methylstyrene units. The capacity of the Dewar flask 1 was about 1.5 dm$^3$ and that of the reaction vessel 2 about 0.8 dm$^3$.

Into the reaction vessel 2 was placed an initial charge consisting of distilled water (400 cm$^3$), acrylonitrile (106 cm$^3$), redistilled α-methylstyrene (5.3 cm$^3$), sodium dodecyl sulphate (0.70 g) and octane-1-thiol (0.92 cm$^3$). Isopentane (600 cm$^3$) was placed in the jacket 8 and the whole system was brought to the boiling point of isopentane at atmospheric pressure (28° C). To initiate the reaction, ammonium persulphate (1.11 g) and sodium metabisulphite (0.925 g) were then added to the reaction vessel through the inlet 6 while a positive pressure of nitrogen was maintained in the vessel to prevent inward diffusion of air. When isopentane began to distil, portions of about 0.5 cm$^3$ of air-free α-methylstyrene were added linearly at the rate of polymerization, as calculated from the rate of distillation of isopentane. (The total distillate of isopentane predicted from 100% yield of the copolymer was 866 cm$^3$.) Isopentane vapour was condensed and returned to the jacket 8 via the burette 12 with corrections to the volume as explained in Example 1. (The correction for the excess temperature of the reaction vessel contents in this example amounted to about 12 cm$^3$ of distilled isopentane per degree Celsius above 28° C.) The reaction was terminated after 340 minutes when the volume of isopentane distilled (corrected for the return of distillate below its boiling point but not for the increased temperature of the reaction medium) was 725 cm$^3$, the temperature of the reaction vessel contents was 29.2° C, and the total volume of α-methylstyrene added subsequently to the initial charge was 51.5 cm$^3$.

The copolymer was isolated as described in Example 1 and had a reduced viscosity of 0.79 at 0.5% in dimethylformamide at 25° C, and full and one-tenth Vicat softening points of 105° C and 96° C respectively. Specimens compression-moulded at 200° C for 5 minutes had an impact strength of 3 J/cm$^3$.

Similar products were made using a gradual feed containing some acrylonitrile as well as α-methylstyrene.

EXAMPLE 12

The device of Example 11 was used to prepare a random copolymer of acrylonitrile and styrene containing 10 mole % of uniformly distributed styrene units.

The initial charge consisted of distilled water (400 cm$^3$), acrylonitrile (206 cm$^3$), styrene (3.2 cm$^3$), sodium dodecyl sulphate (2.0 g) and butane-1-thiol (1.10 cm$^3$). Isopentane was the jacketing liquid as before, and 2.3 cm$^3$ was used of each of the initiator solutions described in Example 1. The gradual feed was an air-free mixture of styrene and butane-1-thiol (0.49% v/v). The total distillate of isopentane for 100% yield was predicted to be 1280 cm$^3$. Corrections to the volume of distillate were made as described in Examples 1 and 11.

The course of the reaction is indicated by the following Table III, where the time is in minutes after adding the initiator, the temperature is that of the reaction medium in °C, under "isopentane" is the total volume in cm$^3$ distilled (corrected for the return of distillate below its boiling point but not for the increased temperature of the reaction medium), and under "styrene" is the total volume (containing 0.49% v/v butane-1-thiol) in cm$^3$ added subsequently to the 3.2 cm$^3$ in the initial charge.

TABLE III

| Time | Isopentane | Styrene | Temperature |
|---|---|---|---|
| 0 | 0 | 0 | 27.2 |
| 76 | 100 | 4.5 | 29.6 |
| 112 | 200 | 7.5 | 30.1 |
| 145 | 300 | 10.5 | 29.9 |
| 175 | 400 | 13.0 | 30.0 |
| 204 | 500 | 16.0 | 30.8 |
| 224 | 600 | 19.5 | 31.0 |
| 271 | 800 | 25.0 | 30.1 |
| 281 | 825 | 25.0 | 28.7 |

The reaction was terminated after 281 minutes and the copolymer isolated as described in Example 1. The product formed after 40% of the monomers had been polymerized had a reduced viscosity of 0.82 at 0.5% in dimethylformamide at 25° C. The polymer (124 g) isolated after the polymerization was terminated had a reduced viscosity of 0.88.

EXAMPLE 13

The device of Example 11 was used to prepare a random copolymer of acrylonitrile and styrene containing 49.3 mole % of uniformly distributed styrene units.

The initial charge consisted of distilled water (350 cm$^3$), acrylonitrile (84 cm$^3$), styrene (36.5 cm$^3$), sodium dodecyl sulphate (2.0 g) and butane-1-thiol (1.5 cm$^3$). Isopentane was the jacketing liquid as before, and 0.45 cm$^3$ of initiator solution was used, each half the strength of those described in Example 1. (Less initiator was needed because the sytrene had previously been freed from polymerization inhibitor by washing with aqueous alkali). The gradual feed was an air-free mixture of styrene and butane-1-thiol (0.45% v/v). The total distillate of isopentane for 100% yield was predicted to be 882 cm$^3$. Corrections to the volume of distillate were made as described in Examples 1 and 11.

The course of the reaction is indicated by the following Table IV, where the time is in minutes after adding the initiator, the temperature is that of the reaction medium in °C, under "isopentane" is the total volume in cm³ distilled (corrected for the return of distillate, below its boiling point but not for the increased temperature of the reaction medium), and under "styrene" is the total volume (containing 0.45% v/v butane-1-thiol in cm³ added subsequently to the 36.5 cm³ in the initial charge. More initiator (0.15 cm³ of each solution) was added at 145 minutes.

TABLE IV

| Time | Isopentane | Styrene | Temperature |
|------|------------|---------|-------------|
| 0    | —          | —       | 27.9        |
| 13   | trace      | 1.5     | 29.5        |
| 20   | 10         | 4.0     | 29.9        |
| 28   | 30         | 9.0     | 31.3        |
| 47   | 100        | 20.0    | 32.9        |
| 73   | 200        | 32.0    | 32.6        |
| 100  | 282        | 41.0    | 31.7        |
| 145  | 395        | 54.6    | 30.7        |
| 164  | 450        | 63.5    | 32.8        |
| 175  | 510        | 75.0    | 35.2        |
| 186  | 550        | 79.0    | 35.0        |
| 250  | 640        | 86.0    | 32.0        |

The reaction was stopped after 250 minutes by adding 5% aqueous sodium dimethyldithiocarbamate (2 cm³) and the copolymer (130 g) was isolated as described in Example 1. It had a reduced viscosity of 1.30, full and one-tenth Vicat softening points of 111° C and 104° C respectively, an impact strength of 2.7 J/cm², and a melt viscosity of 2.8 kP at 260° C and a shear rate of 1000/s.

EXAMPLE 14

A homogeneous copolymer of acrylonitrile and styrene containing 22.4 mole % of randomly distributed styrene units was made from an initial charge consisting of distilled water (400 cm³), acrylonitrile (134 g), redistilled styrene (4.5 g), butane-1-thiol (2.48 cm³) and sodium dodecyl sulphate (2.0 g). Air was removed and replaced by nitrogen. While the reaction vessel was maintained at 28°–34° C, an initiator comprising 5.0% w/v aqueous ammonium persulphate (2.0 cm³) and 4.2% w/v aqueous sodium metabisulphite (2.0 cm³) was added, and then a gradual feed consisting of an airfree mixture of redistilled styrene and butane-1-thiol (1.08% w/v) was added in portions of 0.5–1.0 cm³ linearly at the rate of polymerization, as calculated by the rate of production of heat in the reaction vessel. For 100% yield of copolymer containing 20% molar of styrene units the total heat predicted was 230 kilojoules, and the total amount of styrene to be added was 68 cm³ in addition to the initial charge. The reaction slowed markedly after 165 minutes and was then terminated when the heat of polymerization amounted to 198 kilojoules and the total volume of styrene added subsequently to the initial charge was 59 cm³. The copolymer was isolated as described in Example 1.

The copolymer formed in the above preparation after 30% of the monomers had been polymerized had a reduced viscosity of 1.39 as measured on a solution of 0.5 g of the copolymer in 100 cm³ of dimethylformamide at 25° C. At 60% conversion it had a reduced viscosity of 1.17. The polymer (160 g) isolated after 90% of the monomers were utilized contained 22.4% molar of styrene units and had a reduced viscosity of 1.08 and a melt viscosity of 5.4 kP at 260° C and a shear rate of 1000/s.

This copolymer was compression-moulded at 200° C to give a film about 100 μm thick having a tensile strength of 10 kgf/mm² (elongation at break = 9%). The film was drawn 2.5 times at 100° C with infra-red heating and at a draw rate of 100% per sec, to give an oriented product which was thinner and also stronger having a tensile strength of 12 kgf/mm² (elongation at break = 50%); the modulus of the drawn film was 490 kgf/mm³. The compressionmoulded film was also drawn to 2.7 times its original length in one direction at a temperature of 120°–140° C with infra-red heating and at a draw rate of 100% per sec; the tensile strength of the drawn film was 12 kgf/mm² and it had an elongation at the break point of about 30%.

The copolymer was also made into a series of films, of thickness ranging from 26 μm to 125 μm, by solvent casting from a solution in acetone. Undrawn, each of these films had a strength of 7 kgf/mm² with less than 20% elongation at break. The films were drawn at 110° C, and shrank by 55% when reheated to 110° C (i.e. the draw ratio was effectively about twofold). The modulus of the drawn film was 350 kgf/mm².

For comparison purposes a film was cast from an acrylonitrile/styrene copolymer containing 20 mole % styrene, but where all the styrene was included in the initial mixture instead of being fed to the reaction mixture during the polymerization, i.e. the copolymer was not a homogeneous copolymer with styrene units randomly distributed on the polymer molecules. This film was hazy, turbid, extremely brittle, and very difficult to process. No samples of stretched film could be obtained for this sample.

EXAMPLE 15

A copolymer was produced as described in Example 14 but adjusting the quantities of styrene in the initial charge and gradual feed to give a copolymer containing 15.0 mole % of randomly distributed styrene units. This copolymer had a reduced viscosity of 1.45 as measured on a solution of 0.5 g of the copolymer in 100 cm³ of dimethylformamide at 25° C, and a melt viscosity of 6.0 kP at 260° C and a shear rate of 1000/s.

The copolymer was made into a film about 100 μm thick by solvent-casting at room temperature from a solution in acetone. The undrawn film had a strength of 10 kgf/mm² (elongation at break = 10%), and a modulus of 350 kgf/mm². It was drawn 3.6 times at 120° C, and then had a strength (in the direction of orientation) of 19 kgf/mm² (elongation at break 70%).

EXAMPLE 16

A copolymer latex containing homogeneously copolymerized acrylontrile and stryene units (molar ratio 79:21) was made as described in Example 14. When isolated, the copolymer had a reduced viscosity of 2.14 as measured on a solution of 0.5 g of the copolymer in 100 cm³ of dimethylformamide at 250° C and a melt viscosity at 260° C of 9 kP at a shear rate of 1000/s and 50 kP at a shear rate of 100/s.

The latex was stripped of excess monomer by heating under vacuum at 50° C and was then cast on a continuous band over a drum at 85° C so that the water evaporated quickly without boiling. Sitll supported on the band, the dried film was passed into an oven at 180–200° C, when the particles coalesced and the film became transparent. It was then stripped off, cooled to 100°–120° C, and oriented by stretching.

The latex as used above was also passed directly on to a band at 200° C, when the water evaporated very rapidly and the dried polymer particles coaleased to give a film of thickness 100–150 μm. This film was stripped off, cooled to 100–120° C and oriented by stretching.

EXAMPLE 17

A film 0.51 mm thick was extruded from a homogeneous copolymer comprising 80 mole % acrylonitrile and 20 mole styrene in which the sytrene units were randomly distributed throughout the polymer molecules, the copolymer having a reduced viscosity of 0.84 at 0.5% dimethylformamide at 250° C. The film was stretched simultaneously in two mutually perpendicular directions to twice its original length in each direction. The temperature was 130° C and the draw rate was 60% per second. The resultant film was tough and stiff in both directions, having a modulus of 380 kgf/mm$^2$.

A film as prepared above was also stretched simultaneously in two mutually perpendicular directions to 2.5 times its original length in each direction. The temperature at which the film was stretched was 130° C, and the draw rate was 60% per second. The resultant film had a modulus of 415 kgf/mm$^2$ in each direction.

EXAMPLE 18

A "graft" copolymer with a rubber substrate and in which the superstrate contained randomly copolymerized acrylonitrile units (77 mole %) and styrene units (23 mole %) was made in the device of Example 11 from an initial charge consisting of water (350 cm$^3$), styrene (5.7 g), acrylonitrile (103 g), and a latex (50 g) of a rubber not short-stopped formed from butadiene (70% molar) and acrylonitrile (30% molar) and containing 47.5% solids (pH 5.7). Isopentane was the jacketing liquid as before. To initiate the reaction, ammonium persulphate (1.09 g) and sodium metabisulphite (0.907 g) were added. When isopentane began to distil, a gradual feed of air-free styrene (56 g) was added in portions of 0.5-1.0 cm$^3$ linearly at the rate of polymerization, as calculated from the rate of distillation of isopentane. The styrene was added over 139 minutes from the addition of the initiator, and after 218 minutes 5% w/v aqueous sodium dimethyldithiocarbamate solution (3 cm$^3$) was added. The latex was coagulated using ethanol (1 dm$^3$) at about 60° C and the precipitate was washed four times with water at 60°-70° C and twice with methanol and dried to yield a graft copolymer (150 g) containing 15.8% by weight of rubber. It gave transparent pale yellow mouldings at 200° C. Its impact strength (unnotched specimen) was greater than 19 J/cm$^3$. In a notched specimen test the impact strength was 0.23 J/cm$^2$, and in a tensile test it was not brittle but yielded at 7.3 kgf/mm$^2$.

EXAMPLE 19

A mixture of a polybutadiene latex containing 61% by weight of solids (277 g) and water (675 cm$^3$) was placed in a polymerization vessel and the air replaced by nitrogen. Acrylonitrile (124 cm$^3$) and styrene (3.5 cm$^3$) were then added and the mixture heated to 50° C. Glucose (0.8 g) and cumene hydroperoxide (0.600 g) were added together with sufficient activator (0.08 g ferrous sulphate and 0.40 g sodium pyrophosphate in 50 cm$^3$ water) to give a reasonable rate of polymerization. The rate of polymerization was followed by isothermal calorimetry and styrene was fed to the reaction mixture so that the ratio of acrylonitrile to styrene in the mixture maintained its initial value.

After 2 hours (about 80% completion), the reaction was terminated by the addition of sodium dimethyldithiocarbamate solution (50 cm$^3$ of a 0.5 weight % aqueous solution).

The resultant latex contained a graft copolymer having a polybutadiene substrate and a homogeneous acrylonitrile/styrene copolymer superstrate.

EXAMPLE 20

A homogeneous terpolymer of acrylonitrile, styrene and cetyl vinyl ether containing 21.5 mole % styrene (infra-red analysis) was made from an initial charge of acrylonitrile (334 cm$^3$), styrene (10 cm$^3$), cetyl vinyl ether (8 g) sodium lauryl sulfate (4 g), octane-1-thiol (1.0 cm$^3$) and water (800 cm$^3$). Air was removed from the vessel and replaced by nitrogen, and the temperature increased to about 30° C. Ammonium persulphate (7 cm$^3$, 5% solution) and sodium metabisulphite (7 cm$^3$, 4.2% solution) were added to initiate the reaction; and, while maintaining the temperature approximately constant, a mixture of airfree styrene (109.5 cm$^3$) and octane-1-thiol (1.34 cm$^3$) was added according to the heat output of the reaction. The quantities added are shown in Table V below where the time is in minutes, the heat in kilojoules and the volume of styrene is measured in cm$^3$.

TABLE V

| Time | Styrene | Heat | Time | Styrene | Heat |
|------|---------|------|------|---------|------|
| 0 | 0 | 0 | 98 | 58.0 | 196 |
| 29 | 13.0 | 39 | 109 | 69.0 | 233 |
| 33 | 17.2 | 67 | 114 | 76.0 | 256 |
| 58 | 23.5 | 78 | 121 | 82.5 | 280 |
| 72 | 30.0 | 97 | 128 | 89.0 | 303 |
| 82 | 40.0 | 133 | 135 | 95.0 | 322 |
| 87 | 45.5 | 151 | 142 | 101.5 | 342 |
| 90 | 50.0 | 169 | 151 | 105.0 | 356 |
| 92 | 51.5 | 175 | 169 | 109.5 | 370 |

After 170 minutes a sample was isolated, and this had a reduced viscosity of 1.18. The reaction of the remainder was terminated after 290 minutes and the polymer isolated as for Example 1. The reduced viscosity was 1.05, and full and one-tenth Vicat softening points were 105.4° C and 99.8° C respectively. The melt viscosity was 3.7 kP, the extrudate being colourless.

EXAMPLES 21 - 30

Using the method of Example 1, a series of terpolymer preparations was carried out in which the nature and quantity of the third monomer was varied. Where conditions vary from one preparation to another, these are given in Table VI below. The results are given in Table VII, in which the molar ratio is quoted for acrylonitrile/styrene/third monomer in the terpolymers produced.

The initial charge consisted of distilled water (800 cm$^3$), acrylonitrile (264 cm$^3$), styrene (8.5 cm$^3$), and third monomer, sodium dodecyl sulphate and octane-1-thiol in the quantities stated in Table VI. The air was removed and replaced by nitrogen. The polymerization was initiated by the addition of initiator solutions which consisted of 5% w/v aqueous ammonium persulphate and 5% w/v (or 4.2% w/v where shown) aqueous sodium metabisulphite solutions, and each solution was added in the amount given in Table VI. The temperature was increased to approximately 30° C and the mixture was maintained at about 30° C during the reaction (e.g. in Example 26 the reaction vessel was maintained at 28-34° C).

An air-free feed mixture consisting of styrene (113 cm$^3$), and octane-1-thiol and third monomer in the quantities stated in Table VI, was fed to the reaction mixture at the rate polymerization proceeded as measured by heat output. When the reaction had slowed down (e.g. after 90 minutes in Example 27 by which time 80 cm³ of styrene had been added, and after 115 minutes in Example 29 and adding 70 cm³ of styrene), the polymerization was terminated by the addition of 5% w/v aqueous sodium dimethyldithiocarbamate solution (6 cm³) and the terpolymer was isolated from the latex in the manner described in Example 1.

Key to third monomers in Tables VI and VII

A = acenaphthylene
B = N-vinylcarbazole
C = maleimide
D = N-o-chlorophenylmaleimide
E = 5-cyanonorbornene
F = methylene norbornane tion at 75° C. The solid was separated, washed three times with water at 60° C and dried on a fluidized bed with nitrogen at 80° C. The blend contained 10% by weight of rubber. The dry blend was compression-moulded at 200° C, and the moulded plaque had a notched impact strength of 0.65 J/cm², Vicat softening point of 117° C, and a yield stress of 6.6 kgf/mm².

A blend of the high-softening acrylonitrile/-styrene/N-o-chlorophenylmaleimide terpolymer of Example 25 and the acrylonitrile/styrene/polybutadiene graft copolymer of Example 19 was prepared as follows. 54.2 g of the graft latex was stabilized by the addition of 2,6-di-t-butyl-4-methylphenol (0.8 g) and dilauryl thiodipropionate (0.4 g). The resin latex from Example 25 (284 g) was blended with the stabilized graft latex, and the mixture coagulated by pouring into

TABLE VI

| Example | 21 | 22 | 23 | 24 | 25 | 26 | 27 | 28 | 29 | 30 |
|---|---|---|---|---|---|---|---|---|---|---|
| Third monomer | A | B | C | C | D | D | D | D | E | F |
| Quantities in initial charge | | | | | | | | | | |
| third monomer (g) | 2.3 | 1.25 | 24 | 48 | 30 | 30 | 40 | 83 | 30 | 33 cm³ |
| sodium dodecyl sulphate (g) | 4 | 4 | 5 | 5 | 4 | 4 | 4 | 4 | 4 | 5 |
| octane-1-thiol (cm³) | 1.0 | 1.0 | 1.5 | 1.5 | 1.5 | 1.5 | 1.0 | 1.0 | | 1.3 |
| Quantities of both initiator solutions (cm³) | 35 | ·14.3 | 30 | 30 | 10 | 10 | ·17 | 23 | ·30 | 50 |
| Quantities in feed | | | | | | | | | | |
| third monomer (g) | 35.7 | 47 | | | | | | | | |
| octane-1-thiol (cm³) | 1.5 | 1.5 | 1.5 | 1.5 | 1.5 | 1.5 | 1.5 | 1.5 | | 1.7 |

·(sodium metabisulphite 4.2% w/v)

TABLE VII

| Example | 21 | 22 | 23 | 24 | 25 | 26 | 27 | 28 | 29 | 31 |
|---|---|---|---|---|---|---|---|---|---|---|
| Third monomer | A | B | C | C | D | D | D | D | E | F |
| Molar ratio: acrylonitrile/styrene/third monomer | 80/20/5 | 80/20/5 | 80/20/5 | 80/20/10 | 80/20/3 | 80/20/3 | 80/20/4 | 80/20/8 | 80/20/3 | 80/20/5 |
| Yield of terpolymer (g.) | | 148 | | | | 240 | 240 | | 210 | |
| Reduced viscosity | 0.68 | 0.96 | 1.4 | 0.79 | 0.92 | 1.08 | 1.08 | 0.81 | 3.9 | 6.2 |
| Impact strength (J/cm³) | | | | | | 5.5 | 5.5 | | 5.2 | |
| Vicat softening point (full, ° C) | 124 | 120 | 125 | 137 | 132 | 134 | 134 | 155 | 124 | 123 |

A blend of the high-softening acrylonitrile/-styrene/N-o-chlorophenylmaleimide terpolymer of Example 25 with a compatible acrylonitrile/isobutene/-polybutadiene graft copolymer of the type described in commonly assigned U.S. application Ser. No. 236 976 of Mathews, Nield, Rose and Vincent filed on 22 Mar. 1972 was prepared as follows. To prepare the graft copolymer, an autoclave was charged with acrylonitrile (2394 cm³, 36 moles), polybutadiene (2160 g in the form of 3476 g of latex), cumene hydroperoxide (36.96 g) and dextrose (49.32 g). The vessel was degassed by pressurizing and venting. Isobutene (1440 cm³, 15.4 moles) was then added and the temperature raised to 60° C. The catalyst was then activated with a solution of ferrous sulphate (FeSO₄.7H₂O, 4.93 g) and sodium pyrophosphate (Na₄P₂O₇.10 H₂O, 24.66 g) in water (360 cm³), part of which was added in four aliquots of 45 cm³, 45 cm³, 90 cm³ and 90 cm³ after 0, 30, 60 and 120 minutes respectively. The mixture was maintained at 60° C for 4.5 hours after which time the solids content of the latex was 29.44%, and the butadiene content of the graft was 45.2% by weight.

60.2 g of the graft latex prepared above was stabilized by adding 0.8 g of 2,6-di-t-butyl-4-methylphenol and 0.4 g of dilauryl thiodipropionate. The stabilized graft latex was blended with the resin latex prepared in Example 25 and the blend coagulated by pouring into 1.5 times its volume of aqueous 0.5% w/v aluminium sulphate solu- 1.5 times its volume of 0.5% w/v aluminium sulphate solution at 75° C. The solids were separated, washed three times with water at 60° C and dried on a fluidized bed with nitrogen at 80° C. The blend contained 10% by weight of rubber. A sample of the blend was compression-moulded at 200° C and had a notched impact strength of 0.25 J/cm³, yield stress of 6.6 kgf/mm², and a Vicat softening point of 116° C.

The homogeneous terpolymer of acrylonitrile, styrene and N-o-chlorophenylmaleimide produced in Example 26 was dissolved in acetone ad film was cast from the solution. The film was then dried for 16 hours at 60° C and had a breaking stress of 7.7 kgf/mm² with an elongation at break of 5%. The thickness of the film was 25 μm to 100 μm. The film was drawn uniaxially and the yield stress, breaking stress and elongation at break were measured in the drawn direction. The results are given in Table VIII below. In the direction of the draw the film fibrillated.

TABLE VIII

| Draw temp. ° C | Draw ratio | Yield stress kgf/mm² | Breaking stress kgf/mm² | Elongation at break % | Thickness of drawn film (μm) |
|---|---|---|---|---|---|
| 95 | 2.5:1 | 7.0 | 7.7 | 40 | 58 |
| 95 | 3.0:1 | 8.4 | 10.5 | 30 | 48 |
| 95 | 3.5:1 | 7.9 | 7.7 | 12 | 51 |
| 105 | 2.3:1 | 8.4 | 10.9 | 50 | 41 |

TABLE VIII-continued

| Draw temp. °C | Draw ratio | Yield stress kgf/mm² | Breaking stress kgf/mm² | Elongation at break % | Thickness of drawn film (μm) |
|---|---|---|---|---|---|
| 105 | 2.5:1 | 8.4 | 9.1 | 30 | 38 |
| 105 | 3.5:1 | 9.1 | 9.8 | 15 | 33 |
| 105 | 4.0:1 | 9.1 | 9.1 | 13 | 36 |
| 130 | 6.7:1 | 8.1 | 7.7 | 40 | 33 |

Biaxially drawn film was also made from the terpolymer of Example 26. This had similar properties in both directions and the results given in Table IX below apply to both directions.

TABLE IX

| Draw temperature °C | Draw ratio | Yield stress kgf/mm² | Breaking stress kgf/mm² | Elongation at break % | Thickness of drawn film (μm) |
|---|---|---|---|---|---|
| 95 | (1.6 × 1.6):1 | 6.7 | 5.9 | 34 | 38 |
| 95 | (1.9 × 1.9):1 | 8.4 | 8.1 | 33 | 36 |
| 125 | (2.3 × 2.3):1 | 9.8 | 8.4 | 35 | 13 |

EXAMPLES 31 - 33

Three terpolymers using α-methylstyrene instead of styrene were prepared using the method of the preceding Examples. The conditions and results are shown in Table X below. The molar ratio quoted below in the ratio of acrylonitrile/α-methylstyrene/third monomer in the terpolymer produced.

TABLE X

| Example | | 31 | 32 | 33 |
|---|---|---|---|---|
| Third monomer | | maleimide | N-o-chloro-phenyl-maleimide | N-o-chloro-phenyl-maleimide |
| Molar ratio | | 80:20:4 | 80:20:2 | 80:20:4 |
| Initial charge | | | | |
| water | cm³ | 800 | 800 | 800 |
| acrylonitrile | cm³ | 264 | 264 | 330 |
| α-methyl-styrene | cm³ | 10.0 | 10.0 | 13.5 |
| maleimide | g | 20 | — | — |
| N-o-chloro-phenyl-maleimide | g | — | 20 | 50 |
| sodium dodecyl sulphate | g | 5 | 5 | 5 |
| octane-1-thiol | cm³ | 2.0 | 2.0 | 2.5 |
| quantity of each initiator solution | cm³ | 30 | 30 | 14 |
| Feed | | | | |
| α-methyl-styrene | cm³ | 120 | 120 | 150 |
| octane-1-thiol | cm³ | 0.8 | 1.0 | 0.8 |
| Properties of the terpolymers | | | | |
| Reduced viscosity | | 0.86 | 0.76 | 0.85 |
| Vicat softening point °C | | 126 | 126 | 140 |

A blend of the high-softening acrylonitrile/α-methylstyrene/N-o-chlorophenylmaleimide of terpolymer of Example 32 with an acrylonitrile/isobutene/polybutadiene graft polymer was prepared and isolated as described for Example 25 above, except that the terpolymer latex from Example 25 was replaced by 276.5 g of the latex of Example 32. The notched impact strength of a compressionmoulded sample of the blend was 0.40 J/cm², the Vicat softening point was 119° C and the yield stress was 7.0 kgf/mm².

A blend of the terpolymer of Example 32 and the acrylonitrile/styrene/polybutadiene graft copolymer of Example 19 was prepared as described for Example 25 above except that the terpolymer latex from Example 25 was replaced by 294 g of the latex of Example 32.

A sample of the blend (which contained 10% by weight of rubber) was compression-moulded at 200° C and had a notched impact strength of 0.55 J/cm², a yield stress of 6.6 kgf/mm², and a Vicat softening point of 116° C.

The homogeneous terpolymer of acrylonitrile, α-methyl-styrene and N-o-chlorophenylmaleimide produced in Example 32 was dissolved in acetone and film was cast from the solution and dried for 16 hours at 60° C.

The film had a thickness of 25 μm to 100 μm and had a breaking stress of 8.4 kgf/mm² with an elongation at break of 6%. The film was drawn uniaxially and the yield stress, breaking stress and elongation at break were measured in the drawn direction. The results are given in Table XI below. In the direction of the draw the film fibrillated.

TABLE XI

| temperature °C | Draw ratio | Yield stress kgf/mm² | Breaking stress kgf/mm² | Elongation at break % | Thickness of drawn film (μm) |
|---|---|---|---|---|---|
| 85 | 2.0:1 | 7.0 | 7.7 | 32 | 69 |
| 85 | 3.0:1 | 7.7 | 7.7 | 20 | 58 |
| 100 | 2.5:1 | 6.4 | 6.3 | 54 | 81 |
| 100 | 3.0:1 | 6.5 | 5.6 | 32 | 74 |
| 100 | 3.8:1 | No yield | 7.2 | 9 | 56 |
| 100 | 4.0:1 | No yield | 7.0 | 7 | 56 |
| 105 | 4.0:1 | 6.3 | 4.9 | 44 | 69 |
| 110 | 3.9:1 | 7.7 | 6.7 | 10 | 41 |
| 110 | 4.4:1 | No yield | 7.7 | 6 | 36 |

Biaxially drawn film was also made from the terpolymer of Example 32. This had similar properties in both directions and the results given in Table XII below apply to both directions.

TABLE XII

| Draw temperature °C | Draw ratio | Yield stress kgf/mm² | breaking stress kgf/mm² | Elongation at break % | Thickness of drawn film (μm) |
|---|---|---|---|---|---|
| 110 | (1.6 × 1.6):1 | 8.4 | 7.7 | 35 | 15 |
| 110 | (1.8 × 1.8):1 | 8.4 | 7.7 | 47 | 15 |
| 110 | (2.5 × 2.5):1 | No yield | 9.1 | 6 | 5 |

EXAMPLE 34

Figure 2:
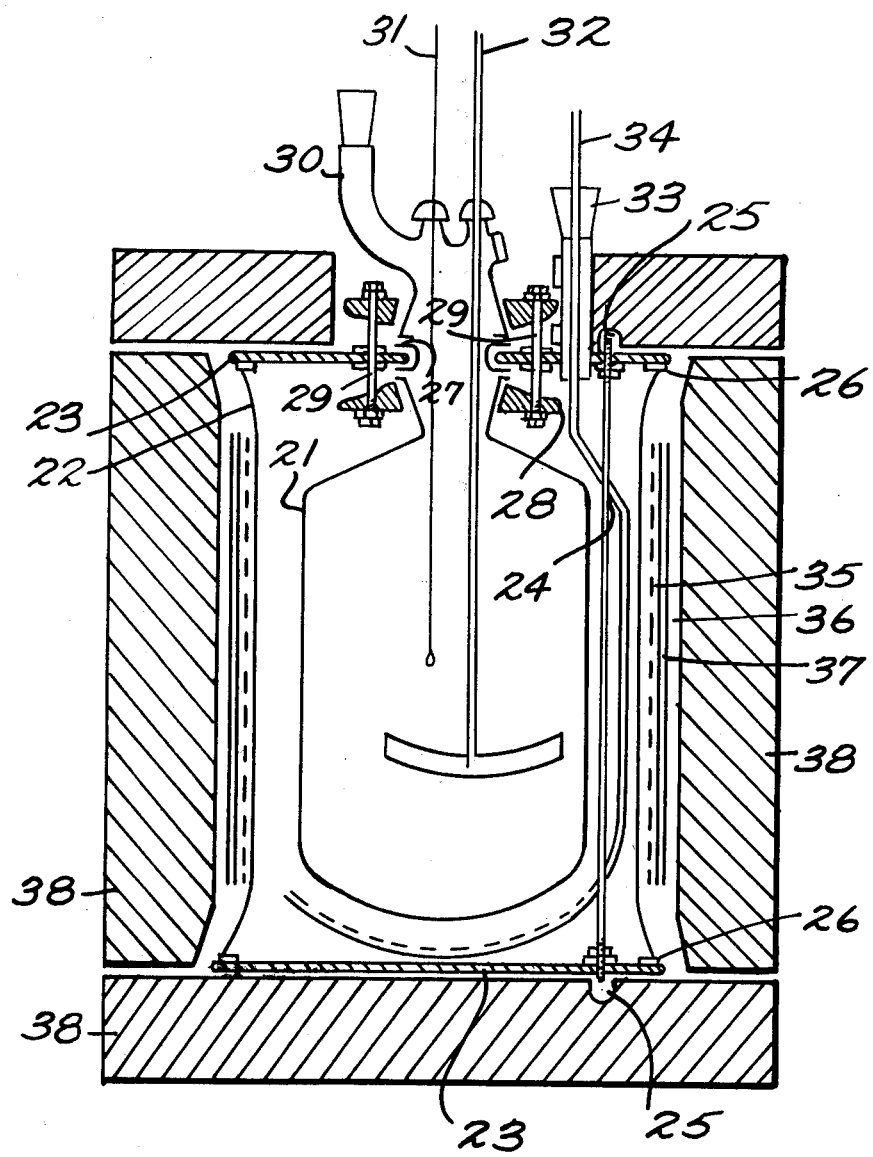
FIG. 2 shows in longitudinal section another apparatus of similar type suitable for reactions on a somewhat larger scale.

A polymerization to produce acrylonitrile/styrene copolymer resin containing 20 mole % styrene was carried out in a 7-liter glass reaction vessel as illustrated in FIG. 2 of the accompanying drawings. The polymerization calorimeter was worked automatically as follows. The coolant, isopentane, distilled from the jacket at a rate proportional to the rate of polymerization. The vapours were condensed and the condensate collected in a 500 cm³ burette. The condensate was pumped from the burette at a rate sufficient to keep the level constant and simultaneously the same metering pump pumped the proportional amount of styrene monomer into the reaction, i.e. the isopentane coolant was pumped more or less continuously at the same rate as it was distilled and therefore the styrene monomer was added to the reaction more or less continuously at a rate determined by the rate of polymerization. The level of condensate in the burette was detected by a photo-electric cell connected to a relay which activated the metering pump.

As in the previous examples a correction to the measured heat had to be made to allow for changes in temperature of the reactants. This was conveniently made by altering the position of the photocell detector so that a different level of condensate was maintained in the burette, thus, if for example the temperature in the reaction vessel rose by 0.5 deg C then the photocell detector was lowered down the burette by a distance representing 50 cm$^3$, because the heat required to warm the reaction vessel plus reactants by 0.5 deg C was equivalent to the heat required to distil 50 cm$^3$ of isopentane.

The initial mixture charged to the reaction vessel contained acrylonitrile (1680 cm$^3$), styrene (50 cm$^3$), sodium lauryl sulphate (20 g), octane-1-thiol (6.4 cm$^3$) and distilled water (4 dm$^3$). The reaction vessel was flushed with nitrogen, and maintained at a slight positive pressure while initiator solutions comprising aqueous 5% ammonium persulphate solution and aqueous 4.2% sodium metabisulphite solution was added gradually until the reaction started (30.6 cm$^3$ of each were required). The feed solution of styrene (678 cm$^3$) contained octane-1-thiol (8.6 cm$^3$).

The course of the reaction is indicated by the following Table XIII, in which the time is in minutes after adding the initiator, the temperature is that of the reaction medium in °C, under "isopentane" is the total volume in cm$^3$ distilled (corrected for the return of distillate below its boiling point), and under "styrene" is the total volume (containing octane-1-thiol) in cm$^3$ added subsequently to the 50 cm$^3$ in the initial charge.

TABLE XIII

| Time | Isopentane | Styrene | Temperature |
|---|---|---|---|
| 0 | 0 | 0 | 28.0 |
| 11 | 500 | 30.5 | 32.2 |
| 23 | 1000 | 60.5 | 32.2 |
| 34 | 1500 | 90.5 | 32.4 |
| 44 | 2000 | 122 | 32.1 |
| 54 | 2500 | 152 | 31.95 |
| 64 | 3000 | 182 | 32.05 |
| 75 | 3500 | 210 | 31.95 |
| 86 | 4000 | 240 | 31.9 |
| 98 | 4500 | 271 | 32.0 |
| 108 | 5000 | 300 | 32.1 |
| 118 | 5500 | 332 | 31.4 |
| 128 | 6000 | 362 | 32.0 |
| 139 | 6500 | 392 | 32.3 |
| 150 | 7000 | 422 | 32.4 |
| 161 | 7500 | 452 | 32.2 |
| 172 | 8000 | 483 | 31.9 |
| 186 | 8500 | 514 | 30.5 |
| 188 | 8560 | 518 | 30.4 |

After 188 minutes from the time the polymerization started, the reaction was short-stopped by the addition of 10 cm$^3$ of 25% sodium dimethyldithiocarbamate diluted to 100 cm$^3$ with water. Excess monomers were stripped off by heating and agitating the latex under vacuum at 40°-50° C for 3-5 hours while maintaining the latex just below the boiling point so that frothing did not occur. Acrylonitrile vapours were swept out from above the latex by introducing into the dead space of the flask a small stream of nitrogen. The polymer was coagulated by pouring the latex into ethanol at 58°-60° C. It contained 20.2 mole % styrene and had a reduced viscosity of 0.80 at 0.5% in dimethyl formamide at 25° C. (A small sample which was isolated after 86 minutes had a reduced viscosity of 0.76.) The melt viscosity was 2.85 kP at 260° C and a shear rate of 1000 s$^{-1}$, and the impact strength was 5.9 J/cm$^3$.

EXAMPLE 35

A polymerization reaction on a still larger scale was carried out in a 20-liter glass vessel as illustrated in FIG. 3 of the accompanying drawing in which the cooling coil had a length of 488 cm and contained 375 cm$^3$ of water (i.e. only 1.9% of the heat capacity of the batch).

The vessel was charged with acrylonitrile (5880 cm$^3$), styrene (175 cm$^3$), sodium lauryl sulphate (60 g), octane-1-thiol (26 cm$^3$) and water (12.3 dm$^3$). After purging the vessel with nitrogen, initiator solutions (aqueous 10% ammonium persulphate and aqueous 8.4% sodium metabisulphate solutions) were added gradually until the polymerization started, 135 cm$^3$ of each initiator being used. During the reaction more styrene containing chain-transfer agent (octane-1-thiol) was added according to the heat output of the reaction as determined by the rise in temperature and flow rate of the circulating water. The heat liberated and the amount of styrene to be added to the reaction were computed electronically from the flow rate and temperature difference and the pump feeding this styrene was actuated automatically. The feed mixture contained 2370 cm$^3$ styrene with 30.8 cm$^3$ of octane-1-thiol. Aqueous sodium dimethyldithiocarbamate solution (0.05%) was added as a moderator throughout the reaction as indicated below. The course of the reaction is shown in the following Table XIV, where the time after completing the addition of initiator is in minutes, the flow rate is the volume of water (cm$^3$) passed through the cooling coil per minute, the column headed "Styrene" gives the volume in cm$^3$ of styrene with n-octyl mercaptan added to the mixture in excess of the 175 cm$^3$ added initially. The temperature is measured in °C.

TABLE XIV

| | Temperatures | | | Flow rate of water | Styrene | Sodium dimethyl-dithio-carbamate solution |
|---|---|---|---|---|---|---|
| Time | vessel | water in | water out | | | |
| 0 | 30.0 | 30.0 | 30.0 | 1695 | 0 | 0 |
| 11 | 31.1 | 26.0 | 30.0 | 1695 | 120 | 15 |
| 45 | 31.5 | 23.0 | 29.4 | 1695 | 450 | 50 |
| 65 | 31.5 | 22.0 | 28.6 | 1695 | 760 | 70 |
| 86 | 31.6 | 21.0 | 28.8 | 1705 | 1090 | 75 |
| 130 | 31.8 | — | — | 1705 | 1730 | 75 |

After 130 minutes the reaction was short-stopped by adding 1 dm$^3$ 0.5% sodium dimethyldithiocarbamate solution, and the polymer was coagulated in ethanol at 60°-70° C, then washed in water and methanol. The polymer contained 21.8 mole % styrene and had a reduced viscosity of 0.66.

EXAMPLE 36

A copolymer of vinylidene chloride and acrylonitrile contaning 15 mole % of randomly distributed units of acrylonitrile was made by the method described below.

Demineralised water (3310 kg), concentrated hydrochloric acid (830 cm$^3$), sodium metabisulphite (4.5 kg), emulsifier and chain-transfer agent were charged to a 7.6 m$^3$ autoclave. The autoclave was purged with nitrogen and evacuated to a pressure of 350 g/cm$^2$.

Vinylidene chloride (1872 kg) and acrylonitrile (82 kg) were charged to the autoclave which was then heated to 60° C. When this temperature had been reached, 18 kg of a 3% w/v solution of ammonium persulphate was injected followed by continuous addition of a further quantity of ammonium persulphate solution at the rate of 18 kg/hour for 4 hours 20 minutes.

The reaction was followed and controlled according to the invention by measuring continuously the heat evolved by the reaction. The temperature of reaction was 65.5 ± 1° C. The heat of reaction was removed from the autoclave by water circulating around the autoclave jacket at the rate of 9.8 dm$^3$/s as measured by an orifice plate. The temperature of the water entering and leaving the autoclave jacket was measured using platinum resistance thermometers. A correction was made to allow for heat losses from the autoclave to the surroundings. The temperature readings and coolant water flow rate were fed to a device designed to emit an electrical pulse after every 1000 Kcals (4200 joules) of heat had been produced by the polymerization process.

A figure of 190 Kcals/kg was taken as the heat of polymerization in order to relate the figure for heat output with the extent of the polymerization. It was required that 61 kg of acrylonitrile be added linearly before 60% conversion of monomer to polymer at the rate at which the polymerization proceeded. The rate at which the acrylonitrile was added is given in Table XV below, in which the reaction time was measured from injection of the ammonium persulphate and each output pulse represented 4200 joules.

TABLE XV

| Reaction Time | | Output Pulses | % Conversion monomer to polymer | Amount acrylo-nitrile to be added to output pulse | Amount acrylo-nitrile added |
|---|---|---|---|---|---|
| hr. | min. | | | kg | kg |
| | 15 | 36 | 9.5 | 9.5 | 6.8 |
| | 30 | 49 | 13.5 | 13.2 | 10.4 |
| | 45 | 62 | 16.2 | 16.3 | 16.3 |
| 1 | 00 | 80 | 21.0 | 21.3 | 22.2 |
| 1 | 15 | 95 | 24.8 | 25.4 | 28.1 |
| 1 | 30 | 113 | 29.3 | 29.9 | 32.7 |
| 1 | 45 | 134 | 34.8 | 35.4 | 36.8 |
| 2 | 00 | 160 | 41.8 | 42.6 | 41.3 |
| 2 | 15 | 185 | 48.0 | 49.0 | 45.8 |
| 2 | 30 | 212 | 55.3 | 56.2 | 49.8 |
| 2 | 45 | 233 | 60.8 | 61.2 | 61.2 |
| 3 | 00 | 271 | 70.7 | | |
| 3 | 15 | 294 | 76.6 | | |
| 3 | 30 | 310 | 80.8 | | |
| 3 | 45 | 334 | 87.0 | | |
| 4 | 00 | 343 | 89.3 | | |
| 4 | 20 | 349 | 90.8 | | |

After a reaction time of 4 hours 20 minutes, when the pressure inside the autoclave had fallen 82 kN/m$^2$ below the maximum value reached during the polymerization process, unreacted monomer was discharged.

The monomer-to-polymer conversion was estimated to be 90.8% using the heat-measuring device, compared with a figure of 94.5% conversion based on weight and solids content of the latex product.

The vinylidene chloride/acrylonitrile resin was isolated from the latex by coagulation and the product, after drying a rotary drier, dissolved in 70/30 w/w tetrahydrofuran-toluene solvent mixture at 34° C to give a 20% w/v solution. A cellulose film coated with such a solution was found to have useful heat-seal and moisture-barrier properties.

I claim:

1. A homogeneous melt-extrudable or injection-mouldable copolymer having a reduced viscosity of at least 0.5 but not more than 3 (as measured on a solution of 0.5 g of the copolymer in 100 cm$^3$ of dimethyl formamide at 25° C), consisting of 50 to 98 mole % of units of acrylonitrile, 2 to 50 mole % of units of at least one conjugated aromatic olefine which has the formula

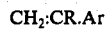
$CH_2{:}CR.Ar$ wherein R is hydrogen or methyl and Ar is an aromatic residue having up to 3 rings or is coumarone or indene, and 0 to 10 mole % of units of other ethylenically unsaturated copolymerizable monomers, the molar ratio of acrylonitrile to conjugated aromatic olefine having about the same value for substantially all the copolymer molecules and the units of conjugated aromatic olefine being randomly distributed in the copolymer molecules, the copolymer being the product of a copolymerization reaction under free-radical polymerization conditions in which the conjugated aromatic olefine is fed to the reaction mixture throughout the polymerization at a rate dependent on the rate of production of heat in the formation of the copolymer.

2. A copolymer according to claim 1 which contains 80 to 90 mole % of units of acrylonitrile.

3. An injection-mouldable copolymer according to claim 1 having a reduced viscosity lying between 0.5 and 1.2 (measured on a solution of 0.5 g of the copolymer in 100 cm$^3$ of dimethylformamide at 25° C) when the molar ratio of units of acrylonitrile to units of conjugated aromatic olefine is less than 4:1 and lying between 0.5 and 1.8 when the molar ratio is 4:1 or more, having a melt viscosity of at most 5.4 kilopoises when measured at 260° C at a shear rate of 1000/second, and having an impact strength of at least 2.4 Joules/cm$^3$.

4. A copolymer according to claim 1 in which the predominant units of conjugated aromatic olefine are selected from styrene and α-methylstyrene units.

5. A copolymer according to claim 1, in which styrene units are the predominant units of conjugated aromatic olefine.

6. A copolymer according to claim 1 which consists essentially of units of acrylonitrile and units of said conjugated aromatic olefine.

7. A copolymer according to claim 1 which consists essentially of units of acrylonitrile and units of styrene.

8. A copolymer according to claim 1 which contains from 1 to 10 mole % of units of other ethylenically unsaturated compounds copolymerized with the acrylonitrile and the conjugated aromatic olefine, the quantity of the units of said other compounds being less than the quantity of units of conjugated aromatic olefine.

9. A copolymer according to claim 8 in which the units of the other ethylenically unsaturated monomer are selected from units of acenaphthylene, N-vinylcarbazole and its derivatives, maleimide and its N-substituted derivatives, and norbornene and its derivatives.

10. A copolymer according to claim 9 which contains units of an N-aryl maleimide.

11. A copolymer as claimed in claim 9 which contains units of N-(o-substituted phenyl) maleimide.

12. A copolymer as claimed in claim 9 which contains units of 5-cyanonorbornene or methylenenorbornane.

13. An oriented film having an elongation at break greater than 50% and a 1% secant modulus greater than 350 kgf/mm$^2$ in the direction of orientation, made from a homogeneous melt-extrudable copolymer having a reduced viscosity of at least 0.5 but not more than 3 (as measured on a solution of 0.5 g of the copolymer in 100 cm$^3$ of dimethyl formamide at 25° C), consisting of 50 to 98 mole % of units of acrylonitrile, 2 to 50 mole % of units of at least one conjugated aromatic olefine which has the formula CH$_2$: CR.Ar wherein R is hydrogen or methyl and Ar is an aromatic residue having up to 3 rings or is coumarone or indene, and 0 to 10 mole % of units of other ethylenically unsaturated copolymerizable monomers, the molar ratio of acrylonitrile to conjugated aromatic olefine having about the same value for substantially all the copolymer molecules and units of conjugated aromatic olefine being randomly distributed in the copolymer molecules, the copolymer being the product of a copolyermization reaction under free-radical polymerization conditions in which the conjugated aromatic olefine is fed to the reaction mixture throughout the polymerization at the rate at which polymerization proceeds.

14. A film according to claim 13 which is biaxially oriented.

15. A film according to claim 13 which is uniaxially oriented.

16. A film according to claim 15 which is thereafter fibrillated.

17. A film according to claim 16 in the form of twine produced by twisting the film while maintaining it under tension in the direction of orientation.

18. A film according to claim 13 when used as packaging material for wrapping foodstuffs.

19. An oriened film made from a homogeneous melt extrudable copolymer consisting of 50 to 90% molar of units of acrylonitrile, 10 to 50% molar of units of styrene and the molar ratio of acrylonitrile to styrene having about the same value for substantially all of the polymer molecules and said styrene units being randomly distributed in the polymer molecules, said copolymer being the product of copolymerizing under free radical polymerization conditions in which styrene is fed to the reaction medium throughout the polymerization at the rate at which polymerization proceeds, said copolymer having a reduced viscosity within the range 0.5 to 3 as measured on a solution of 0.5 g. of the copolymer in 100 cm$^3$ of dimethylformamide at 25° C., and the film having an elongation at break greater than about 50% and a 1% secant module greater than 350 kgf in the direction of orientation.

20. An oriented film according to claim 19 in which the copolymer contains 80 to 90% molar of units of acrylonitrile.

21. An oriented film according to claim 19 in which the copolymer contains 66 to 80% molar of units of acrylonitrile.

22. An oriented film made from a homogeneous melt extrudable copolymer consisting of 50 to 90% molar of units of acrylonitrile, 10 to 50% molar of units of styrene and from 1 to 10% of units of other ethylenically unsaturated compounds copolymerized with the acrylonitrile and the styrene, the quantity of the units of said other compounds being less than the quantity of styrene units, the molar proportions of acrylonitrile, styrene and said other ethylenically unsaturated compounds having about the same value for substantially all of the polymer molecules and the units being randomly distributed in the polymer molecules, said copolymer being the product of copolymerizing under free radical polymerization conditions in which styrene is fed to the reaction medium during polymerization at the rate at which polymerizaion proceeds, said copolymer having a reduced viscosity within the range 0.5 to 3 as measured on a solution of 0.5 g of the copolymer in 100 cm$^3$ of dimethylformamide at 25° C., and the film having an elongation at break greater than about 50% and a 1% secant modulus greater than 350 kgf in the direction of orientation.

23. An oriented film according to claim 22 in which the copolymer contains 80 to 90% molar of units of acrylonitrile.

24. An oriented film according to claim 22 in which the copolymer contains 66 to 80% molar of units of acrylonitrile.

25. A homogeneous melt extrudable copolymer consisting of 50 to 90% molar of units of acrylonitrile and 10 to 50% molar of units of styrene, the molar ratio of acrylonitrile to styrene having about the same value for substantially all of the polymer molecules and said styrene units being randomly distributed in the polymer molecules, said copolymer being the product of copolymerizing under free radical polymerization conditions in which styrene is fed to the reaction medium throughout the polymerization at a rate dependent on the rate of production of heat in the formation of the copolymer, said copolymer having a reduced viscosity within the range 0.5 to 3 as measured on a solution of 0.5 g. of the copolymer in 100 cm$^3$ of dimethylformamide at 25° C., and said polymer being capable of forming a melt extruded oriented film having an elongation at break greater than about 50% and a 1% secant modulus greater than 350 kgf in the direction of orientation.

26. A copolymer according to claim 25 in which the copolymer contains 80 to 90% molar of units of acrylonitrile.

27. A copolymer according to claim 25 in which the copolymer contains 66 to 80% molar of units of acrylonitrile.

28. A homogeneous melt extrudable copolymer consisting of 50 to 90% molar of units of acrylonitrile, 10 to 50% molar of units of styrene and from 1 to 10% of units of other ethylenically unsaturated compounds copolymerized with the acrylonitrile and the styrene, the quantity of the units of said other compounds being less than the quantity of styrene units, the molar proportions of acrylonitrile, styrene and said other ethylenically unsaturated compounds having about the same value for substantially all of the polymer molecules and the units being randomly distributed in the polymer molecules, said copolymer being the product of copolymerizing under free radical polymerization conditions in which styrene is fed to the reaction medium during polymerization at a rate dependent on the rate of production of heat in the formation of the copolymer, said copolymer having a reduced viscosity within the range 0.5 to 3 as measured on a solution of 0.5 g of the copolymer 100 cm$^3$ of dimethylformamide at 25° C., and said polymer being capable of forming a melt extruded oriented film having an elongation at break greater than about 50% and a 1% secant modulus greater than 350 kgf in the direction of orientation.

29. A copolymer according to claim 28 in which the copolymer contains 80 to 90% molar of units of acrylonitrile.

30. A copolymer according to claim 28 in which the copolymer contains 66 to 80% molar of units of acrylonitrile.

31. A homogeneous melt extrudable copolymer consisting of 50 to 90% molar of units of acrylonitrile, 10 to 50% molar of units of styrene and the molar ratio of acrylonitrile to styrene having about the same value for substantially all of the polymer molecules and said styrene units being randomly distributed in the polymer molecules, said copolymer being the product of copolymerizing under free radical polymerization conditions in which styrene is fed to the reaction medium throughout the polymerization at the rate at which polymerization proceeds, said copolymer having a reduced viscosity within the range 0.5 to 3 as measured on a solution of 0.5 g of the copolymer in 100 cm³ of dimethylformamide at 25° C., and said copolymer being capable of forming, by melt extrusion into a film which is then oriented, an oriented film having an elongation at break greater than about 50% and a 1% secant modulus greater than 350 kgf in the direction of orientation.

32. A copolymer according to claim 31 which contains 80 to 90% molar of units of acrylonitrile.

33. A copolymer according to claim 31 which contains 66 to 80% molar of units of acrylonitrile.

34. A product as set forth in claim 31 in which there is fed to the reaction medium throughout the polymerization a monomer feed consisting essentially of styrene.

35. A product as set forth in claim 31 in which there is fed to the reaction medium throughout the polymerization a monomer feed which includes acrylonitrile in addition to styrene.

36. A homogeneous melt extrudable copolymer consisting of 50 to 90% molar of units of acrylonitrile, 10 to 50% molar of units of styrene and from 1 to 10% of units of other ethylenically unsaturated compounds copolymerized with the acrylonitrile and the styrene, the quantity of the units of said other compounds being less than the quantity of styrene units, the molar proportions of acrylonitrile, styrene and said other ethylenically unsaturated compounds having about the same value for substantially all of the polymer molecules and the units being randomly distributed in the polymer molecules, said copolymer being the product of copolymerizing under free radical polymerization conditions in which styrene is fed to the reaction medium during polymerization at the rate at which polymerization proceeds, said copolymer having a reduced viscosity within the range 0.5 to 3 as measured on a solution of 0.5 g of the copolymer in 100 cm³ of dimethylformamide at 25° C., and said copolymer being capable of forming, by melt extrusion into a film which is then oriented, an oriented film having an elongation at break greater than about 50% and a 1% secant modulus greater than 350 kgf in the direction of orientation.

37. A copolymer according to claim 36 which contains 80 to 90% molar of units of acrylonitrile.

38. A copolymer according to claim 36 which contains 66 to 80% molar of units of acrylonitrile.

39. A product as set forth in claim 36 in which there is fed to the reaction medium during the polymerization a monomer feed consisting essentially of styrene.

40. A product as set forth in claim 36 in which there is fed to the reaction medium during the polymerization a monomer feed which includes acrylonitrile in addition to styrene.

41. A homogeneous melt extrudable copolymer having a reduced viscosity of at least 0.5 but not more than 3 (as measured on a solution of 0.5 g of the copolymer in 100 cm³ of dimethylformamide at 25° C), consisting of 50 to 98 mole % of units of acrylonitrile, 2 to 50 mole % of units of at least one conjugated aromatic olefin which has the formula $$CH_2:CR.Ar$$

wherein R is hydrogen or methyl and Ar is an aromatic residue having up to 3 rings or is coumarone or indene, and 0 to 10 mole % of units of other ethylenically unsaturated copolymerizable monomers, the molar ratio of acrylonitrile to conjugated aromatic olefin having about the same value for substantially all the copolymer molecules and units of conjugated aromatic olefin being randomly distributed in the copolymer molecules, the copolymer being the product of a copolymerization reaction under free radical polymerization conditions in which the conjugated aromatic olefin is fed to the reaction mixture throughout the polymerization at the rate at which polymerization proceeds, said copolymer being capable of forming, by melt extrusion into a film which is then oriented, an oriented film having an elongation at break greater than 50% and a 1% secant modulus greater than 350 kgf/mm² in the direction of orientation.

42. A product as set forth in claim 41 in which there is fed to the reaction medium throughout the polymerization a monomer feed which consists essentially of styrene.

43. A product as set forth in claim 41 in which there is fed to the reaction medium throughout the polymerization a monomer feed which includes acrylonitrile in addition to said aromatic olefin.

* * * * *

UNITED STATES PATENT OFFICE
CERTIFICATE OF CORRECTION

Patent No. 4,039,734    Dated August 2, 1977

Inventor(s) Brian Norman HENDY

It is certified that error appears in the above-identified patent and that said Letters Patent are hereby corrected as shown below:

Title page, item 63, line 4, "347,567, April 3, 1973," should read -- 347,565, April 3, 1973, abandoned, --.

Column 1, lines 10, 11 and 18, replace "347,567" by -- 347,565 --

Column 1, line 28, delete "except Ser. No. 347,667".

Column 2, line 43, replace "Chemic" by -- Chemie --.

Column 3, line 13, replace "sampl" by -- sample --.

Column 3, line 46, replace "may" by -- my --.

Column 5, line 24, replace "3" by -- 30 --.

Column 6, line 22, insert -- 50 -- after "film".

Column 7, line 17, insert a comma after "p-acetamidostyrene".

Column 7, line 18, replace "p-trimethylsilystyrene" by -- p-trimethylsilylstyrene --.

Column 7, line 39, replace "pof" by -- of --.

Column 12, line 19, replace "presennt" by -- present --.

Column 12, lines 31-33, replace "application Ser. No. 236,976... 22 Mar. 1972" by -- Patent No. 3,816,563 --.

Column 12, line 38, replace "in" by -- is --.

Column 13, line 10, replace "morbornene" by -- norbornene --.

UNITED STATES PATENT OFFICE
CERTIFICATE OF CORRECTION

Patent No. 4,039,734  Dated August 2, 1977

Inventor(s) Brian Norman HENDY

It is certified that error appears in the above-identified patent and that said Letters Patent are hereby corrected as shown below:

Column 13, line 45, replace "any" by -- and --.

Column 13, line 53, replace "borbornene" by -- norbornene --.

Column 14, line 50, change "leat" to -- least -- and insert a period after "preferred".

Column 14, line 63, replace "drw" by -- draw --.

Column 16, line 34, replace "other" by -- Other --.

Column 16, line 60, replace "filled" by -- milled --.

Column 24, line 10, insert a comma after "(8 g)".

Column 25, lines 45-47, Replace "application Ser. No. 236,976 . . . 22 Mar. 1972" by -- Patent No. 3,816,563 --.

Column 26, line 52, replace "ad" by -- and --.

Column 30, line 5, replace "drawing" by -- drawings --.

Column 31, line 58, insert "in" after -- drying --.

Column 33, line 13, replace "copolyermization" by -- copolymerization --.

UNITED STATES PATENT OFFICE
CERTIFICATE OF CORRECTION

Patent No. 4,039,734　　　　　　　　Dated August 2, 1977

Inventor(s) Brian Norman HENDY

It is certified that error appears in the above-identified patent and that said Letters Patent are hereby corrected as shown below:

Column 33, line 29, replace "oriened" by -- oriented --.

Column 33, line 67, replace "polymerizaion" by
　　　　　-- polymerization --.

Signed and Sealed this

Twenty-eighth Day of February 1978

[SEAL]

Attest:

RUTH C. MASON　　　　　　　　　LUTRELLE F. PARKER
*Attesting Officer*　　　　*Acting Commissioner of Patents and Trademarks*